(12) United States Patent
Buscemi et al.

(10) Patent No.: US 12,476,966 B2
(45) Date of Patent: Nov. 18, 2025

(54) METHODS AND APPARATUS FOR PROVIDING BIOMETRIC AUTHENTICATION AND AUTHORIZATION SERVICES

(71) Applicant: CECELUMEN, LLC, Camarillo, CA (US)

(72) Inventors: James Buscemi, Camarillo, CA (US); Jason Laver, Thousand Oaks, CA (US); James Harvey Brodeur, Camarillo, CA (US); Benjamin Baysinger, Camarillo, CA (US)

(73) Assignee: CECELUMEN, LLC, Camarillo, CA (US)

( * ) Notice: Subject to any disclaimer, the term of this patent is extended or adjusted under 35 U.S.C. 154(b) by 190 days.

(21) Appl. No.: 17/676,116

(22) Filed: Feb. 18, 2022

(65) Prior Publication Data
US 2022/0329589 A1   Oct. 13, 2022

Related U.S. Application Data

(63) Continuation-in-part of application No. 17/396,751, filed on Aug. 8, 2021, now Pat. No. 11,936,648,
(Continued)

(51) Int. Cl.
*G06F 21/32* (2013.01)
*H04L 9/40* (2022.01)

(52) U.S. Cl.
CPC .......... *H04L 63/0861* (2013.01); *H04L 63/10* (2013.01)

(58) Field of Classification Search
None
See application file for complete search history.

(56) References Cited

U.S. PATENT DOCUMENTS

| 5,177,889 | A | 1/1993 | Ching Hwei |
| 5,692,327 | A | 12/1997 | Wynne et al. |

(Continued)

FOREIGN PATENT DOCUMENTS

| CN | 108521855 A | 9/2018 |
| CN | 108564541 A | 9/2018 |

(Continued)

*Primary Examiner* — Fatoumata Traore
(74) *Attorney, Agent, or Firm* — Straub & Straub; Michael P. Straub; Stephen T. Straub

(57) ABSTRACT

Methods and apparatus are described which allow different companies, individuals and/or government entities to use biometric security and/or access systems or services without having to store biometric information for individuals on a ongoing basis and/or to perform a comparison between recently captured biometric information corresponding to an individual seeking access to a location or a service. In various embodiments a biometric server is used to control access to stored biometric information where the server and/or database storing the biometric server are located remotely, e.g., at a central location, physically remote from the sites where access to locations and/or services are provided. The storage and use of the biometric information can be and often is implemented and controlled by a separate company from the company using the server to determine whether access or a service should be provided to an individual.

20 Claims, 14 Drawing Sheets

Related U.S. Application Data which is a continuation of application No. 16/162,159, filed on Oct. 16, 2018, now Pat. No. 11,089,014, which is a continuation of application No. 15/084,883, filed on Mar. 30, 2016, now Pat. No. 10,129,253.

(60) Provisional application No. 63/150,582, filed on Feb. 18, 2021, provisional application No. 62/274,972, filed on Jan. 5, 2016, provisional application No. 62/185,489, filed on Jun. 26, 2015.

(56) References Cited

U.S. PATENT DOCUMENTS

| | | | |
|---|---|---|---|
| 6,556,337 B1 | 4/2003 | Wright | |
| 8,984,151 B1 | 3/2015 | Hsieh et al. | |
| 9,396,354 B1* | 7/2016 | Murphy | G06F 21/32 |
| 9,415,745 B1 | 8/2016 | Clemen, Jr. et al. | |
| 9,702,183 B1 | 7/2017 | Ochiai et al. | |
| 9,934,397 B2 | 4/2018 | Calo et al. | |
| 10,129,253 B2 | 11/2018 | Buscemi | |
| 10,346,119 B2 | 7/2019 | LeBlanc et al. | |
| 10,475,145 B1 | 11/2019 | Lester | |
| 10,656,801 B1 | 5/2020 | Goodman | |
| 10,744,936 B1 | 8/2020 | Budhia et al. | |
| 11,040,619 B1 | 6/2021 | Martin | |
| 11,089,014 B2 | 8/2021 | Buscemi | |
| 11,936,648 B2 | 3/2024 | Buscemi | |
| 2004/0036952 A1 | 2/2004 | Wright | |
| 2006/0000895 A1* | 1/2006 | Bonalle | G06F 21/34 |
| | | | 235/382 |
| 2007/0153091 A1 | 7/2007 | Watlington et al. | |
| 2007/0185718 A1* | 8/2007 | Di Mambro | G07C 9/37 |
| | | | 704/270.1 |
| 2008/0012827 A1 | 1/2008 | Ryu et al. | |
| 2008/0062008 A1 | 3/2008 | Morimoto et al. | |
| 2008/0094529 A1 | 4/2008 | He et al. | |
| 2009/0168185 A1 | 7/2009 | Augustine | |
| 2010/0192096 A1 | 7/2010 | Barrett | |
| 2011/0078933 A1 | 4/2011 | Lukawitz et al. | |
| 2011/0093411 A1 | 4/2011 | Gibson | |
| 2011/0135192 A1 | 6/2011 | Yokono | |
| 2011/0202968 A1* | 8/2011 | Nurmi | G06F 21/10 |
| | | | 726/1 |
| 2011/0252675 A1 | 10/2011 | Thomas | |
| 2012/0011085 A1 | 1/2012 | Kocks et al. | |
| 2012/0241227 A1 | 9/2012 | Rogers et al. | |
| 2012/0256541 A1 | 10/2012 | Dandrow | |
| 2012/0287326 A1 | 11/2012 | Border et al. | |
| 2013/0173466 A1 | 7/2013 | Lepisto et al. | |
| 2013/0311664 A1 | 11/2013 | Pirnazar | |
| 2013/0335807 A1 | 12/2013 | Arsenault et al. | |
| 2014/0003082 A1 | 1/2014 | Calderas | |
| 2014/0118812 A1 | 5/2014 | Olenick | |
| 2014/0287723 A1 | 9/2014 | LaFever et al. | |
| 2014/0337930 A1 | 11/2014 | Hoyos et al. | |
| 2015/0026078 A1 | 1/2015 | Weich et al. | |
| 2015/0033153 A1 | 1/2015 | Knysz et al. | |
| 2015/0128285 A1 | 5/2015 | LaFever et al. | |
| 2015/0161970 A1 | 6/2015 | Sunkara et al. | |
| 2015/0194082 A1 | 7/2015 | McEwan | |
| 2015/0261813 A1 | 9/2015 | Pappula | |
| 2015/0360604 A1 | 12/2015 | Cameron et al. | |
| 2016/0014346 A1 | 1/2016 | Kobayashi et al. | |
| 2016/0025978 A1 | 1/2016 | Mallinson | |
| 2016/0152177 A1 | 6/2016 | Dandrow | |
| 2016/0291855 A1 | 10/2016 | Chang et al. | |
| 2017/0174137 A1 | 6/2017 | Kawaguchi | |
| 2017/0278546 A1 | 9/2017 | Xiao et al. | |
| 2018/0060542 A1 | 3/2018 | Anders | |
| 2018/0082220 A1* | 3/2018 | Bombacino | G06Q 10/02 |
| 2018/0088887 A1 | 3/2018 | LeBlanc et al. | |
| 2018/0290522 A1 | 10/2018 | Rosales | |
| 2019/0014271 A1* | 1/2019 | Itoh | A61B 5/1171 |
| 2019/0100083 A1 | 4/2019 | Ghannam et al. | |
| 2019/0213931 A1 | 7/2019 | Brubaker | |
| 2019/0379750 A1 | 12/2019 | Zamora Duran et al. | |
| 2020/0007338 A1* | 1/2020 | Oh | H04L 9/0866 |
| 2020/0104092 A1 | 4/2020 | Cohen et al. | |
| 2020/0108700 A1 | 4/2020 | Flanigan et al. | |
| 2020/0184098 A1 | 6/2020 | Andrasick et al. | |
| 2020/0211201 A1 | 7/2020 | Chiang et al. | |
| 2020/0292905 A1 | 9/2020 | Larry et al. | |
| 2020/0382719 A1 | 12/2020 | Lee et al. | |
| 2021/0056750 A1 | 2/2021 | Rowley | |
| 2021/0133355 A1 | 5/2021 | Verma et al. | |
| 2022/0121764 A1 | 4/2022 | Buscemi et al. | |
| 2022/0121839 A1 | 4/2022 | Tagra et al. | |
| 2022/0198062 A1 | 6/2022 | Buscemi et al. | |
| 2022/0230457 A1 | 7/2022 | Buscemi | |

FOREIGN PATENT DOCUMENTS

| | | |
|---|---|---|
| JP | 2012100000 A | 5/2012 |
| JP | 2016200753 A | 12/2016 |
| JP | 2016538661 A | 12/2016 |
| WO | 2016092383 A1 | 6/2016 |
| WO | 2018035492 A1 | 2/2018 |
| WO | 2019020973 A1 | 1/2019 |

* cited by examiner

METHODS AND APPARATUS FOR PROVIDING BIOMETRIC AUTHENTICATION AND AUTHORIZATION SERVICES

RELATED APPLICATIONS

The present application claims the benefit of U.S. provisional patent application Ser. No. 63/150,582 filed Feb. 18, 2021 and is a continuation-in-part of U.S. patent application Ser. No. 17/396,751 which was filed on Aug. 8, 2021, which is a continuation of U.S. patent application Ser. No. 16/162,159 which was filed Oct. 16, 2018, which issued as U.S. Pat. No. 11,089,014 on Aug. 10, 2021 and which was published as US patent publication 2019-0052633 A1 and which is a continuation of U.S. patent application Ser. No. 15/084,883 which was filed Mar. 30, 2016, which issued as U.S. Pat. No. 10,129,253 on Nov. 13, 2018 and which claims benefit of U.S. Provisional Patent Application Ser. No. 62/185,489 filed on Jun. 26, 2015 and which also claims benefit of U.S. Provisional Patent Application Ser. No. 62/274,972 which was filed on Jan. 5, 2016. Each of the preceding listed patents. patent applications and patent publications are hereby expressly incorporated by reference in their entirety.

FIELD

The application relates to methods and apparatus for providing a biometric identification service.

BACKGROUND

Biometric information is used in a wide variety of applications which often involve some form of security. For example, biometric information can be captured and used in determining if an individual is entitled to access an area, building or device or to receive a service. Biometric information can also be used in determining if a person is entitled to access an amusement park using a season pass or ticket which was issued to be used by a specific individual. There seems to be an ever increasing range of applications where biometric information can be and/or is used.

One problem with biometric applications is the need to collect and store biometric information, e.g., one or more images, eye scans, fingerprint scans, voice samples, etc. of an individual which can later be used to confirm the identity of an individual before granting of some authorization, e.g., to access a building or to obtain a service.

While many companies would like to use biometric information in one or more security applications, they often forgo the use of such systems to avoid the need to collect and store biometric information on their customers, employees or other users as is normally required to implement a biometric security system.

There are many reasons companies may want to avoid collecting and storing biometric information on their own systems. Some deal with the difficulty of having to initially collect and store biometric information which can then be used for authentication purposes at some further time. While the time and resources needed to collect and store biometric information for future use is one reason some companies are reluctant to implement biometric based security systems because they are concerned with the need to protect collected biometric information from potential hackers and/or unauthorized users. Thus, it should be appreciated that in many cases the reluctance to collect and store biometric information relates to one or both of: i) the need to provide physical infrastructure used for storing, maintaining and/or using biometric information and ii) the difficulty with keeping such information secure and, in some cases, a manner that complies with government regulations. For example, General Data Protection Regulation (GDPR) sets forth rules for organizations that offer goods and services to people in the European Union or that collect and analyze data for EU residents. State and/or federal regulations may also relate to the control, storage, use and/or dissemination of biometric information. Companies may not want to take on the obligation of keeping up with such regulations and complying with such regulations which may include requirements that individuals be notified of data breaches and/or that their data be deleted upon request.

If the technical problem of collecting and storing biometric information could be addressed so that individual companies seeking to use biometric security systems did not have to collect or store biometric information to be used for authentication, it would likely lead to increased use of such systems. Furthermore, individual companies could avoid having to store and maintain biometric information, and they could use biometric authentication as part of a security system without concern for having to maintain the physical infrastructure and/or database needed to support a biometric security system. In addition, if companies seeking to use biometric technology could support/use biometric services without storing and maintaining the biometric information corresponding to individuals such as customers or employees, they could obtain the technical and security benefits of such services without incurring responsibility for complying with regulations relating to the storage and maintenance of such information.

In view of the above it should be appreciated that there is a need for methods and/or apparatus that can be used to support biometric services, e.g., access control and/or identity based authorization, which would allow businesses and/or system owners to use and take advantage of such services without having to address the technical and/or network security related issues of collecting and maintaining biometric information used for such services.

SUMMARY

Methods and apparatus for allowing entities, e.g., businesses government entities, and/or individuals, with the ability to use biometric information for security applications and/or other purposes including e.g., authentication and/or authorization purposes, are described. The methods allow the entity using the information, e.g., for authentication and/or authorization purposes, to obtain biometric services without having to store and maintain the biometric information. This is achieved by having a biometric service provider handle the storage and maintenance of the biometric information, e.g., at a separate site, where a biometric service provider stores and maintains such information. Images or other biometric samples are communicated to the biometric service provider system, biometric server, e.g., as part of a query. The biometric server returns, as response to the query, an identifier identifying an individual to which the biometric information is determined to correspond in the case where an individual is identified and/or information indicating whether the identified individual is authorized to access an area or is entitled to one or more services.

In some embodiments individuals are identified by numbers assigned by the biometric server, e.g., at the time the individual user registers and authorizes his/her biometric information to be used for one or purposes and/or businesses. The individual user identifier numbers are generated automatically in some embodiments, e.g., using a pseudo random number generator to generate the identifiers. This reduces the risk that a party monitoring or intercepting a query or query response will be able to match the number to an actual individual without additional information. While in some embodiments the user identifier, e.g., numeric or alphanumeric value, is assigned by the biometric server, in other embodiments an identifier supplied by a company is provided for an individual seeking to register for service. For example, an employer may assign an employee ID which is used as an identifier of an individual when providing biometric identification services to the employer or a ticket number may be used as an identifier of an individual who purchased a park admission ticket. In such cases the biometric service can support biometric identification services and return the identifier corresponding to a detected individual which is to be used for the business/employer submitting a query without the biometric server having to know or store the actual name or address information corresponding to individual being identified, e.g., employee or ticket holder/purchaser.

In some cases the biometric server stores rights/entitlement information, indicating access and/or entitlement rights. In such cases a response to a biometric query may and sometimes does include an indication of an action to be taken which is authorized by the access and/or entitlement rights corresponding to an individual identified based on biometric information, e.g., an image, supplied with or as part of the query. The action/entitlement rights information in such cases maybe and sometimes is returned with an identifier identify an individual shown in the query image., is returned, in some embodiments. In other embodiments the identifier of one or more individuals who are identified as being shown in the query image is returned in a response to the received biometric query and the system to which the identifier is returned determines what the identified individual is entitled to, e.g., what area access permissions the identified individual has and/or what services the identified individual is entitled to receive. Accordingly in such cases the business using the biometric server for identification purposes need not provide confidential business access or service privilege information to the biometric server. In at least some cases a system using the biometric server for identification services does not even require that the actual name or identity of the individual being provided services or access be stored or provided the biometric server. The decoupling of the information stored in the biometric server from the actual identity, e.g., true name of the individual being identified by the biometric server, can greatly increase security as compared to system where true identity information is stored with biometric information used for identification purposes since even if the information in the biometric server is hacked or accessed, it will not include in such cases the true identity of the individual to which the stored biometric information corresponds. Thus, businesses can obtain biometric identification services for employees and customers without even having to provide the true identity of the individuals for which biometric information is supplied to the biometric server and for which biometric identification is supported. For example, a company can identify an individual as an employee or ticket purchaser by providing an associated employee number or ticket number, have the employee or ticket purchaser provide biometric information, e.g., an image of the person as a biometric sample, and the biometric server can later identify the individual or ticket purchaser based on the supplied biometric sample. When the employee or ticket purchaser attempts to access an area or obtain a service such as a park ride, an image of the individual is captured by a camera, sent to the biometric server as part of a query and the biometric server then returns the identifier corresponding to the individual, e.g., an employee number or other identifier such as ticket number. In some cases, the biometric server may authorize an action or service for the identified individual if it was provisioned with service/rights information corresponding to the identified individual or simply return the identifier corresponding to the individual, e.g., numeric value assigned or used to identify the employee or ticket holder for example with the business system to which the identifier is returned then determining the rights/action or service to provide. The business system may, and sometimes does, take an automatic action based on the response from the biometric server, e.g., automatically opening a lock, allowing access to an area or providing a service by allowing admission to a park ride.

While the true name of the individual, e.g., employee, ticket holder or customer for which biometric information is stored and used for identification purposes is not stored in some embodiments for some companies or customers, in other embodiments the actual identity of an individual is stored and used as the identifier of the individual or in addition to a numeric or alphanumeric identifier corresponding to the individual for which biometric identification information is stored and used. In fact, in some cases the user identity is verified using public or other records, e.g., drivers' license photos.

In accordance with the invention, in various embodiments, individuals and/or companies provide biometric information to a biometric security system, e.g., a server, sometimes referred to as a biometric server, which stores and uses the information for security purposes, e.g., identification, authentication and/or authorization purposes. Along with the provided biometric information, information identifying the individual to which the biometric information corresponds, e.g., name, address and/or an identifier such as a number associated with the individual, is provided in some embodiments. In most cases the individual is normally a person. However, the methods and apparatus described herein can be applied to security systems which are intended to be used with animals, e.g., house pets, as well. Accordingly, an individual is to be interpreted broadly and can be a person or animal depending on the particular application with which the system is used.

Optionally, automated verification may be performed to confirm that the provided biometric information corresponds to the actual individual, e.g., human person with which the information is to be associated, e.g., the individual identified as the person to which the biometric information corresponds. Public records, e.g., driver license photos, Internet postings and/or other sources of publicly or privately available information can be, and sometimes are, used as part of the automated verification process, e.g., with some publicly or privately available biometric information corresponding to the individual with which the provided biometric information being compared to at least some of the provided information to assess whether the provided biometric samples corresponded to the individual with which they are to be associated.

An entity providing the biometric information can specify companies and/or users which are permitted for the provided biometric information.

Methods and apparatus are described which allow different companies, individuals and/or government entities to use biometric security and/or access systems or services without having to store biometric information for individuals on an ongoing basis and/or to perform a comparison between recently captured biometric information corresponding to an individual seeking access to a location or a service.

In various embodiments a biometric server is used to control access to stored biometric information where the server and/or database storing the biometric server are located remotely, e.g., at a central location, physically remote from the sites where access to locations and/or services are provided and/or to which identification information is supplied after an individual is identified based on biometric information, e.g., an image, is provided as part of a query The storage and use of the biometric information can be, and often is, implemented and controlled by a separate company, e.g., a company implementing the biometric server and providing biometric based identification services, from the company using the biometric server to identify or confirm the identity of an individual and/or determine whether access or a service should be provided to an individual. The storage and use of the biometric information is implemented in accordance with government requirements and/or laws, with the individual companies using the server not having to ensure compliance with such requirements/laws since that is done by the biometric server operator who controls the storage and use of the stored biometric information.

In some embodiments individuals can make data subject requests requesting changes to the use of the biometric information they provided with the biometric server automatically implementing such requests. Individuals can also request deletion of biometric information that was supplied as part of a registration process with the biometric server implementing such requests. In addition, in the event of a data breach the biometric server is responsible for automatically notifying affected individuals of the breach. In this way the biometric server operator and biometric server relieve companies using the biometric server for biometric services from such obligations to the extent that they exist, e.g., under regulations or laws governing the use of biometric information.

By centralizing the storage and access/service decisions based on biometric data, the same stored data can be used to provide biometric identification services and support access/service grant or denial decisions to a wide range of companies, individuals and/or government entities without the entities having to manage the storage of biometric data used for verification purposes. This can remove much of the burden of creating, maintaining, and securing the biometric data used for verification purposes from the entities seeking to implement biometric security for particular applications and can allow multiple companies to rely on the same set of biometric data while also allowing individuals, whose biometric information is stored, the right to control the use of their biometric information and restrict which companies/entities can use the stored biometric data. Accordingly, the methods and apparatus of the present invention facilitate not only user control over their biometric information and samples, but also make it easy for companies to incorporate biometric verification and access controls without having to store or independently verify biometric information and also potentially allow individual companies (biometric service subscribers) to avoid possible liability for the potential improper storage or release of biometric data by allowing companies to use such data but not have direct access to or control over the data. In addition, in some cases the companies using the biometric service do not need to be involved in collecting the initial samples of biometric information used for identification purposes since users can register directly with the biometric server and supply biometric information samples thereto without involvement of a company which they may authorize to use biometric services provided by the biometric server, The centralized biometric service provider, e.g., the company implementing and operating the biometric security server ensures, in some embodiments, that laws and requirements relating to the storage and use of biometric data are complied with. Thus, not only the technical problems of how to implement such a system is avoided for the service subscribers, the need to monitor and implement system changes as government regulations change is avoided by shifting these obligations onto the biometric service operator in at least some embodiments.

In various embodiment a company seeking to use biometric security installs an automatic door or gate blocking access to a location or service. A camera or other sensor, e.g., mic, is used to capture a biometric sample, e.g., image or speech sample of an individual who seeks access to the location or service protected using the automatic door or gate. The captured sample is communicated, e.g., in a service or access query message, in many cases after being encrypted, to a biosecurity server located at a site which is physically remote, e.g., miles away, from the location where access or service is being sought. The biometric server compares the received sample, e.g., after description if encrypted, to biometric information, e.g., samples. stored in its database. If the received biometric information matches that of an individual who is authorized to access the location or receive service being sought, e.g., which may be, and often is, indicated in the received query message, a response message is sent to the device which sent the query message indicating that the requested access or service is authorized, and that the request should be granted. If the biometric information that is received in the query message does not match an individual authorized to receive the service or access being sought, the query response message that is sent indicates that the requested access or service should be denied. The gate, door or other access/service control device at the site where the biometric sample included in the query was captured is controlled based on the received query response with the door or gate being automatically opened or the requested access/service being granted if the response message indicates that it should be granted, or the access service is automatically denied when the query response indicates it should be denied.

Thus the methods and appatus of the present invention allow for biometric security to be implemented with relatively little hardware at an end user's site, e.g., biometric security service user's site with the equipment at the end site including in some embodiments an automated access control device (e.g., powered door or gate lock), biometric capture device (e.g., camera or mic), control processor which is coupled to the other components and which is configured to and does control i) biometric sample capture, ii) the automated access control device and ii) the communications device to communicate and operate in accordance with one or more of the described methods.

While many embodiments and features have been discussed in the above summary, it should be appreciated that many of the novel features described herein can be used independent of other novel features. Thus, while various exemplary embodiments have been described, the application is not limited to the particular exemplary embodiments or combinations of features described in particular exemplary embodiments. Numerous additional features and embodiments are described in the detailed description which follows.

DETAILED DESCRIPTION

Figure 1:
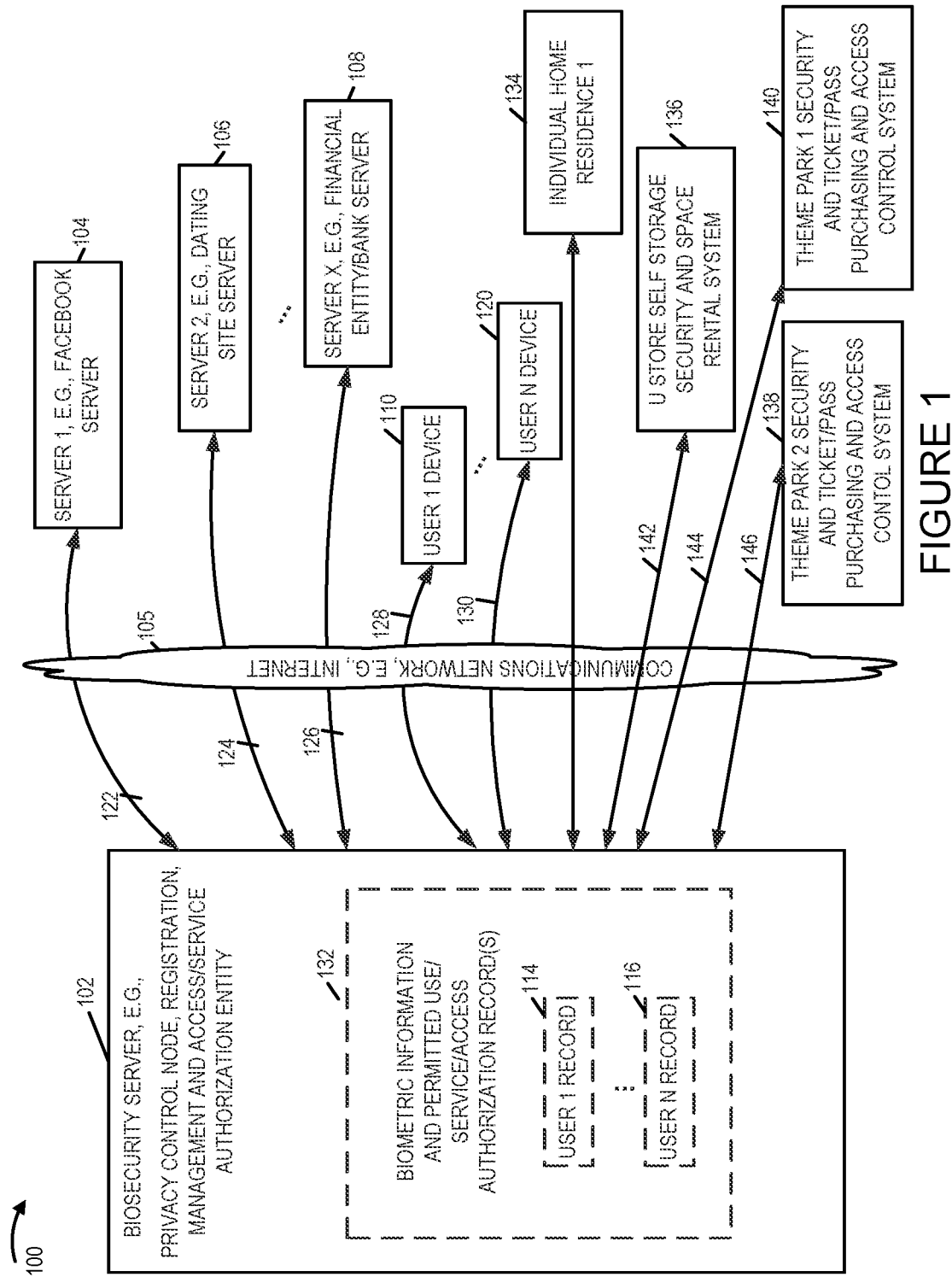
FIG. 1 illustrates an exemplary system, including a biometric server (sometimes also referred to as a biosecurity server) and various biometric service subscriber devices, implemented in accordance with the present invention.

FIG. 1 illustrates an exemplary system 100 implemented in accordance with an exemplary embodiment. Exemplary system 100 supports creating customer records based on individual provided sharing preference information and use of such information to verify/determine whether one or more individuals have permitted the use of their images and/or other information, e.g., by networks, service providers and/or other entities and/or whether the individual is authorized to access a location and/or obtain a service.

Exemplary system 100 includes a biometric server 102 (sometimes referred to as a biosecurity server), a plurality of servers/devices 104, 106, . . . , 108 corresponding to service providers, social and/or non-social networks etc., and a plurality of individual user devices 110, . . . , 120 corresponding to individual(s) who may store biometric information in the records/database maintained and used by the biometric server 102. The biometric server, also sometimes referred to as the privacy control node 102 (also referred to as the registration and biometric information management entity at various locations in the present application) operates as an independent control node that assists various network servers and devices 104, 106, . . . , 108 in determining whether an individual has authorized use of his or her images and/or other personal information and/or whether a individual should be allowed access to a location and/or service. The plurality of servers/devices corresponding to service providers, social and/or non-social networks in the system include a server 1 104 corresponding to a social network, e.g., such as Facebook, a server 2 106 corresponding to a dating site, e.g., such as match.com or such and a server X 108 corresponding to a financial institution/entity such as a bank. The user equipment devices (UEs) (also referred to as user device) in the system 100 include user 1 device 110 through user N device 120 which correspond to various individuals/users. A user device may be a Smartphone, laptop, PC, a tablet device, Smart TV or another communications device via which a user can communicate information with other devices in the system.

The privacy control node 102 in some embodiments includes, e.g., stores in a memory, a customer record database 132 including customer records corresponding to a plurality of individuals/users including user 1 record 114, . . . , and user N record 116. Each of the customer records 114 through 116 includes customer information corresponding to the individual/customer to which the record corresponds including, e.g., biometric samples and/or extracted templates, use and/or sharing preference information set by the users or another handler, e.g., entity representing the user. The customer sharing preference information indicates user restrictions and/or authorized uses of images, facial recognition templates and/or other biometric information of the individual, authorized services, entities and/or authorized web sites for which the individual has indicated his/her images and/or information may be used. Thus the sharing preference information for an individual stored in the customer record indicates whether the individual has authorized use of his or her image and/or other information for one or more purposes/uses and/or identifies authorized services, entities, websites, networks etc., for which the individual has indicated his/her image and/or information may be used, e.g., for sharing on a public or private platform, for performing identity verifications and/or for other uses in accordance with the features of the invention. In some other embodiments the customer record database 132 including customer records may not be stored within the privacy control node 102 but rather externally at a secure site, with the privacy control server 102 being able to securely access, manage and/or maintain the customer record database 132 including the customer records. The information and/or signaling can be communicated from the privacy control node 102 over the communications network 105 via a privacy control node network interface which couples the privacy control node 102, via the links 122, 124, 126 to the plurality of servers/devices. The customer record database 132 and the information stored therein are discussed in greater detail later.

In accordance with one feature of some embodiments when a service provider server, networking site server and/or other entity (e.g., such as servers 104, 106, 108) intends to use an image and/or other information corresponding to an individual, the server sends a query including biometric information which can be used to identify one or more individuals to the privacy control server 102 requesting assistance in determining if an individual in the image and/or individual to whom the biometric information corresponds has authorized use of his or her information. In some embodiments a query may include biometric information and/or extracted feature sets which the requesting party is sending for testing to determine if they match a user's stored biometric information. In various embodiments the querying device/server sends the query prior to using the image and/or information corresponding to the individual, e.g., prior to publishing/posting one or more images and/or profile information corresponding to the user of interest on a website. In some embodiments upon receiving the query from a querying device/server the privacy control server 102 identifies an individual based on the received biometric information for whom sharing authorization information is sought, determines, using the stored information in the customer database 132 corresponding to the identified individual whether the identified individual has authorized use of information corresponding to the identified individual or an image of the identified individual, and responds to the querying device/server with information indicating whether the use has been authorized or not.

Figure 2:
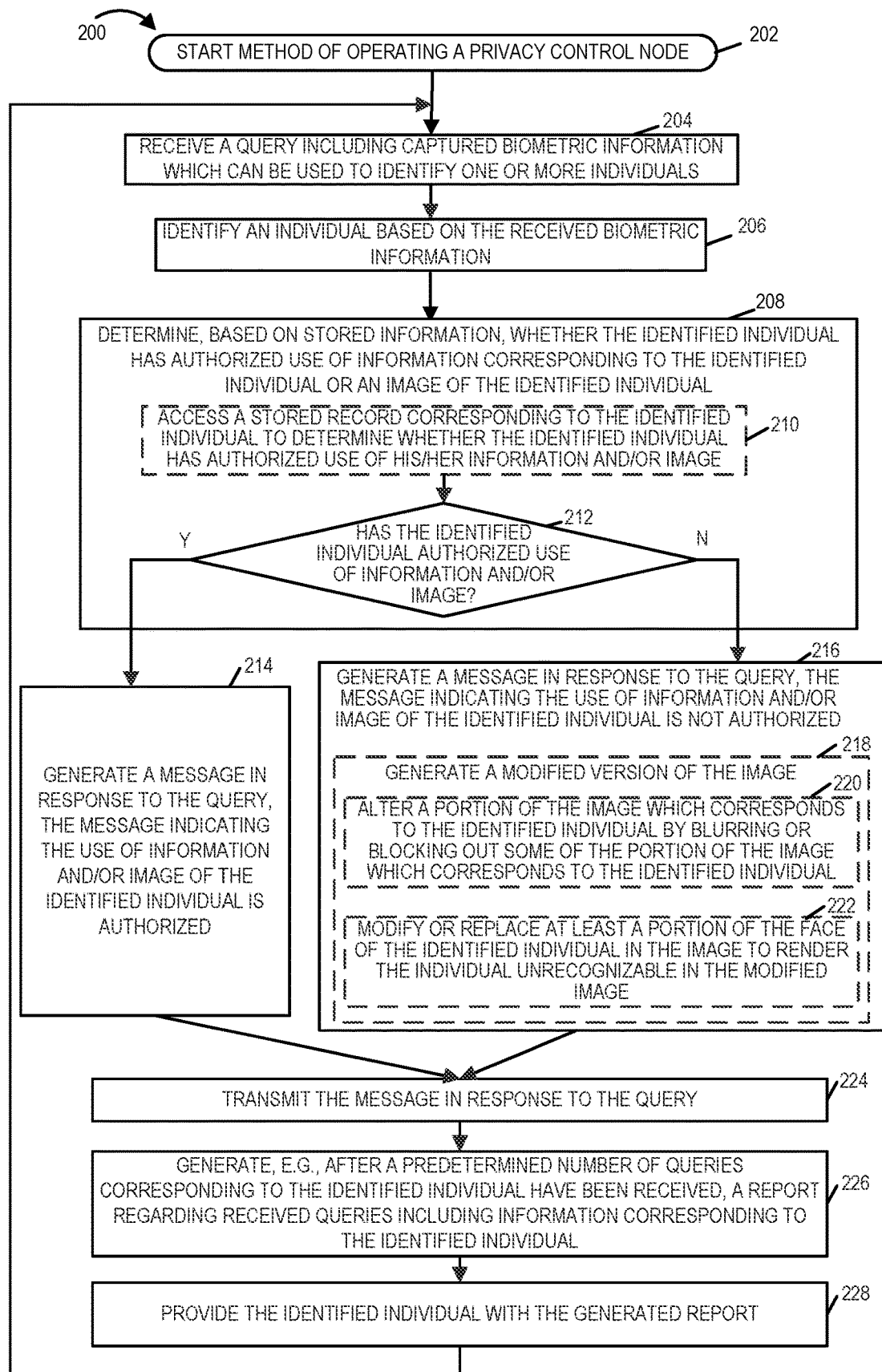
FIG. 2 is a flowchart illustrating the steps of an exemplary method of operating an exemplary privacy control server in accordance with an exemplary embodiment of the invention.

FIG. 2 is a flowchart 200 illustrating the steps of an exemplary method of operating an exemplary privacy control device, e.g., privacy control server 102, in accordance with an exemplary embodiment of the invention. The exemplary method starts in step 202 with the privacy control device being powered on. Operation proceeds from start step 202 to step 204. In step 204 the privacy control device receives a query including captured biometric information, e.g., biometric samples, which can be used to identify and/or match the identity of one or more individuals. In some embodiments the biometric information includes an image of the identified individual. In some embodiments the biometric information include weight or a fingerprint scan of the user. While actual biometric information may be included in queries sometimes, in some embodiments queries include biometric templates, e.g., digital numerical data extracted from captured raw biometric samples using signal processing and computation. The query may be received from a device and/or server that intends to use information, e.g., images or other data, of an individual to whom the information included in the query corresponds. The use of information and/or images may include, e.g., publishing/posting of the information and/or images corresponding to the individual on a social networking site, dating site, professional networking site and/or using the images for other commercial or non-commercial purposes, use of biometric data such as signatures and/or fingerprints for verification of financial transactions and/or access to objects or sites. The use of the information and/or images of the individual may also include the use of images by an adult site server. For example, Facebook server 104 may send an inquiry including an image of an individual to the privacy control server 102 requesting sharing preference of the individual in the image prior to allowing the image and/or one or more other images of the individual to be posted on the Facebook webpage.

Operation proceeds from step 204 to step 206. In step 206 the privacy control server 102 identifies an individual based on the received biometric information and/or template with the query. In some embodiments when the biometric information in query is an image with a plurality of individuals in the image, the device sending the query also provides information indicating an individual of interest in the image, among the plurality of individuals in the image, for which sharing preference and/or other information is sought. In various embodiments the privacy control server 102 performs the identification of the individual using the receiver biometric information to recognize/identify the individual. The identification in some embodiments includes determining and extracting the facial characteristics/features and/or recognition data corresponding to the individual from the image. In some embodiments when multiple individuals are included in the image provided as part of the query, the privacy control server identifies each of the individuals to which the information in the query corresponds. For example, the privacy control server 102 may first use image recognition and/or other techniques for identifying the individuals in a similar manner as discussed above and then search the customer record database 132 for matching individuals. As should be appreciated, identification of the individual is needed in order for the privacy control server 102 to perform further processing (e.g., locate corresponding individual's customer record and check corresponding sharing preference and/or other information) and respond to the query.

Figure 4:
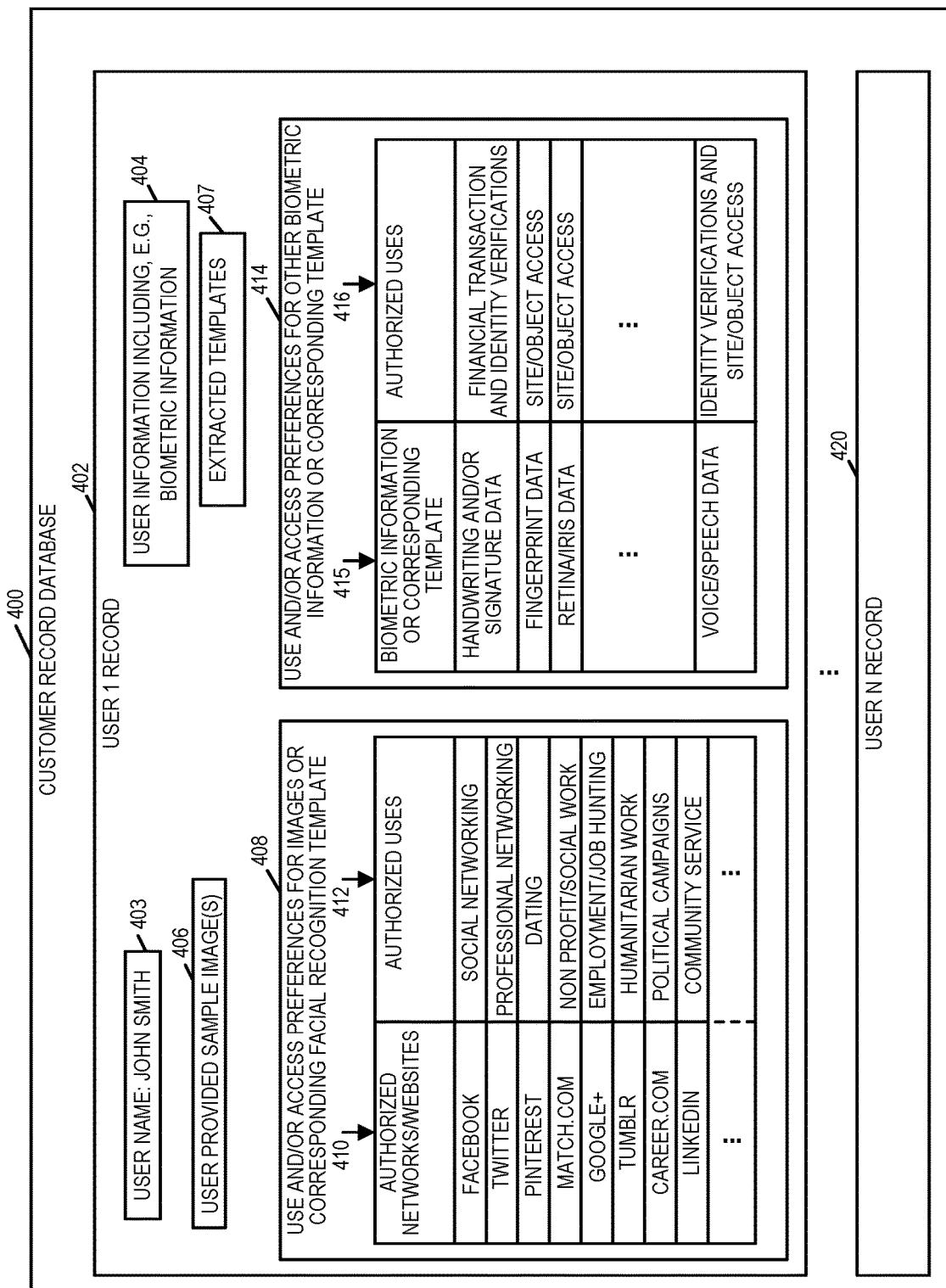
FIG. 4 illustrates an exemplary customer record database including exemplary customer records corresponding to different users in accordance with one exemplary embodiment.

In various embodiments the privacy control server 102 stores and/or has access to a customer database record 132 including information regarding sharing preference and/or image use authorization information corresponding to a plurality of customers. Such an exemplary customer database with customer records corresponding to one or more customers is illustrated in FIG. 4 and discussed below. In some embodiments after identifying the individual the privacy control server 102 checks, e.g., performs a lookup, of the customer record database 132 to check if a record corresponding to the individual exists in the database. In some embodiments the privacy control server 102 compares the identification information corresponding to the individual identified in step 206 to identification information corresponding to various customers in the database 132 to find if there is a match. The identification information in the customer record corresponding to an individual may include, one or more sample images, biometric information including images and/or facial recognition data, voice sample, handwriting and/or signature sample, fingerprint sample, retina and/or iris scan sample and/or other feature/characteristic data indicative of biometric modalities corresponding to an individual.

Operation proceeds from step 206 to step 208. In step 208 the privacy control server 102 determines, from stored information whether the identified individual has authorized use of information corresponding to the identified individual or an image of the identified individual. In various embodiments the privacy control server 102 makes the determination in step 208 based on such information stored in the customer record database 132. In various embodiments the stored information indentifies authorized uses of information and/or images of the identified individual, authorized services or authorized web sites for which the user has indicated his/her image or other identification information may be used. In addition, the stored information in some embodiments further includes restrictions set by the user or another handler as to how the biometric information is not to be used, e.g., for commercial purposes and/or for sharing on a public domain. In some embodiments the information corresponding to the identified user includes at least one of user sharing preference information, user purchase history, web browsing information. In some embodiments when the sharing preference/authorization information for an individual of interest in not readily available but at least some contact information such as an email address, phone number, messenger identity (e.g., such as SKYPE ID and/or a chat messenger ID) is available to the privacy control server 102, the privacy control server 102 sends a request to the individual using the available contact information to specify if the individual has any objection to the use of information and/or images corresponding to the individual. In some such embodiments the privacy control server 102 also sends an invitation to the individual, as part of the request, encouraging the individual to create his/her profile on the privacy control server 102 for resolving future inquiries regarding the use of the individual's images and/or other information. For discussion purposes it is considered that a record corresponding to the identified individual exists in the customer record database 132.

In various embodiments steps 210 and 212 are performed as part of determining step 208. In step 210 the privacy control server 102 accesses a stored record corresponding to the individual of interest to check if the individual has authorized the use of information corresponding to the identified individual or an image of the identified individual. In step 212 a determination is made based on the accessed customer record information whether the identified individual has authorized the use of information and/or image. Since it is possible that a user may allow/authorize use of his/her information and/or images for some purposes, e.g., posting pictures or information on Facebook or any other social network by friends, dating sites, professional networking sites etc., while not authorizing use for other purposes such as by adult/porn sites, controversial/banned group websites, commercial uses etc., in some embodiments the determination in step 208 is also based on further additional information which may be either provided as part of the query in step 204 or obtained by the privacy control server 102 from other sources. Such additional information includes, for example: identification information of the device/server intending to use the images/information of the individual, purpose of use, whether the device/server intending to use would allow the individual to edit/delete the information later, whether the device/server intending to use is earning a profit by using the image of the individual, whether the device/server intending to use the image will likely use the individual's image or other information for political and/or advertisement campaigns etc. If it is determined that the identified individual has authorized the use of his/her information and/or image, then operation proceeds from step 208 (including steps 210, 212) to step 214. In step 214 the privacy control server 102 generates a message, in response to the query, indicating the use of the information and/or image of the identified individual is authorized. Operation proceeds from step 214 to step 224.

If however in step 212 it is determined that the identified individual has not authorized the use of his/her information and/or image, then operation proceeds from step 208 (including steps 210, 212) to step 216. In step 216 the privacy control server 102 generates a response message, in response to the query, indicating the use of information and/or image of the identified individual is not authorized. In some embodiments where the received biometric information includes an image of the identified individual the privacy control server 102 in step 218 the privacy control server 102 generates a modified version of the image to be included in the response message as part of generating the response message. In some embodiments performing step 218 includes performing one or both of the sub-steps 220 and 222. In sub-step 220 a portion of the image which corresponds to the identified individual is altered, e.g., by blurring or blocking out some portion of the image of the identified individual. Alternatively, or in addition to sub-step 220, in some embodiments sub-step 222 is performed wherein at least a portion of the face of the identified individual in the image is modified or replaced to render the individual unrecognizable in the modified version of the image. Thus, in some embodiments a modified version of the image is included in the generated response message. In some other embodiments while a response message is generated in step 216 responding to the query, steps 218, 220 and 222 are not performed. Operation proceeds from step 216 to step 224.

Returning to step 224. In step 224 the privacy control server 102 transmits the generated message to the querying device in response to the query. Operation proceeds from step 224 to step 226. In step 226 the privacy control server 102 generates a report for the identified individual regarding received queries from one or more devices/servers, the report including images in which the individual was identified. In some embodiments the privacy control server 102 monitors and keeps track of the number of queries received for the plurality of individuals/customers and generates a report on a per customer basis, e.g., after a predetermined number of queries corresponding to the individual have been received. In some embodiments the report includes, in addition to the images in which the individual was identified, identification information corresponding to the querying device/server that inquired to use the information and/or images, a purpose of use if any was provided in the query, identification of a person/entity who wanted to post/tag the image and/or information of the individual using the querying server as the platform for posting etc.

Operation proceeds from step 226 to step 228. In step 228 the generated report is communicated by the privacy control server 102 to the identified individual, e.g., via an email and/or as a text message and/or or an online report file which can be accessed by the identified individual using a user-name/password combination provided by the privacy control server 102 to the individual. Operation proceeds from step 228 back to 204 and may be repeated for additional received queries corresponding to one or more individuals.

In some embodiments where a query includes an image including multiple individuals, the privacy control server identifies individuals to which the information in the query corresponds. In some embodiments the privacy control server 102/300 uses image recognition, information specified in the query and information in the customer record database to identify individuals in a photo submitted as part of resolving a query. For each identified individual, the privacy control server 102/300 then checks the corresponding customer record and information sharing preferences and returns a reply based on the customer record information. When multiple individuals are included in the image provided as part of the query, the query response may, and sometimes does, include a copy of the image submitted as part of the query but with the images of the individuals who indicated a desire that their image not be used blocked out, blurred or otherwise indicated as being subject to a privacy request. Thus, using the response, the querying party can determine which individual or individuals shown in an image has indicated a desire for their image not to be used in the manner intended by the querying party.

Figure 3:
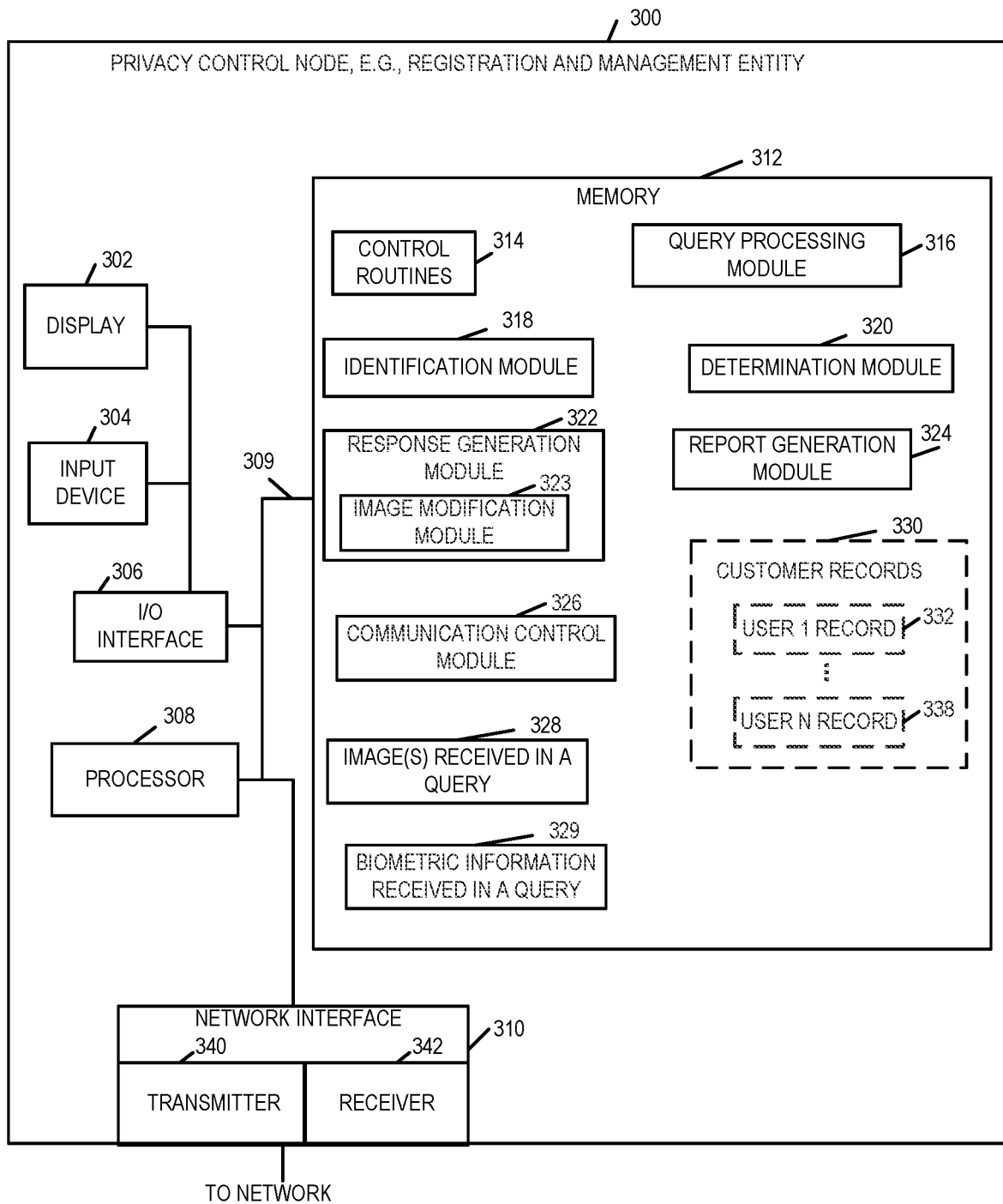
FIG. 3 illustrates an exemplary biometric server, e.g., privacy control node (also referred to as the registration and management entity) implemented in accordance with one embodiment of the invention and which can be used as the biometric server of FIG. 1.

FIG. 3 illustrates an exemplary privacy control node 300, e.g., a registration and biometric information management node, in accordance with an exemplary embodiment of the invention. The exemplary privacy control node 300 may be used as the privacy control node 102 of FIG. 1 and is used, in some embodiments. to implement the methods of the present invention such as those shown in FIGS. 2 and 6. The registration and biometric information management node 300 is sometimes also referred to as privacy the Biometric Protection Bureau server since the node 300 works as a security and protection bureau for biometric information.

As illustrated, the privacy control node 300 includes a display 302, an input device 304, an input/output (I/O) interface 306, a processor 308, a network interface 310, and a memory 312. The various components of the privacy control node 300 are coupled together via bus 309 which allows for data to be communicated between the components of the privacy control node 300. The memory 312 includes control routines and modules. The processor 308, e.g., a CPU, executes various routines and/or modules and uses information stored in memory 312 to control the privacy control node 300 to implement the methods of the present invention and operate in accordance with the invention. The processor 308 is responsible for controlling the overall general operation of the privacy control node 300. In some embodiments the processor 308 is configured to perform functions that have been discussed as being performed by the privacy control node 300.

The display 300 may be used by an administrator/operator to view information and/or images received by the privacy control node 300. The input device 304 may be a keyboard, touchpad, a voice controlled input device etc., via which input can be provided to the privacy control node 300, e.g., to provide information and/or change parameters for controlling the operation of the privacy control node 300.

The I/O interface 306 couples the display 302 and the input device 304 to bus 309. Via the I/O interface 306, the privacy control node 300 can be coupled to an external device. Via the network interface 310 the privacy control node 300 communicates and/or receives signals and/or information (e.g., including queries, registration/enrollment requests, response messages and reports) to/from various devices over a communications network, e.g., such as communications network 105. The network interface 310 includes a transmitter 340 and a receiver 342 via which the transmitting and receiving operations are performed.

The memory 312 includes control routines 314, a query processing module 316, an identification module 318, a determination module 320, a response generation module 322, a report generation module 324, a communications control module 326, and data/information including images received in a query 328 and biometric information received in a query 329. In some embodiments the memory 312 further includes stored customer records 330 including customer records corresponding to a plurality of customers including user 1 record 332, . . . , and user N record 338. In various embodiments the stored customer records are created as part a registration process during which an individual user or another handler such as a parent/guardian of a minor provides biometric information corresponding to the individual along with sharing preferences and/or restrictions to be applied. In some embodiments while the customer records 330 are not stored within the privacy control node 300, the customer records 330 are accessible by the node 300 in a secure manner. The customer records 330 include the same or similar information as the customer record database 132.

The control routines 314 include device control routines and communications routines to control the operation of the privacy control node 300. The query processing module 316 is configured to process a query, e.g., received via the receiver 342 from a querying device, to recover and retrieve biometric information and/or image(s) included in the query for further processing, e.g., for further use by one or more other modules (e.g., such as the determination module 320, response generation module 322 etc.) which use the information included in a received query to make determinations and/or take further actions based on the information in accordance with the invention.

The identification module 318 is configured to identify an individual based on the received information in a query. The information received in a query may include, e.g., actual captured biometric information, e.g., biometric samples, or templates extracted from captured biometric information. In various embodiments the identification module 318 uses the information included in the received query to identify the individual for whom it is to be determined whether use of information and/or image is authorized or not. In some embodiments the received biometric information includes an image of the individual and the identification module 318 analyses the received image to recognize features of the individual in the image, generate identification data from the image using recognized features and compare the identification data against the biometric information and/or identification data and/or images of customers stored in the customer records 330. The stored biometric information and/or identification data may include images of the individual and/or user features such as eye spacing, eye color, height, and/or information indicating one or more facial characteristics that may be used for facial recognition to identify the individual in images provided by others. In some embodiments based on the comparison the identification module 318 determines if there is a match and whether a record corresponding to the individual exists in the customer records 330. In some embodiments where a query includes other information corresponding to the individual, in addition to or as an alternative to an image, the identification module 318 uses this information to identify the individual, e.g., by comparing the received identification information to the identification data, e.g., biometric data and other information in the user profile, of customers stored in the customer records 330.

The determination module 320 is configured to determine, from stored information included in customer records 330, whether the identified individual has authorized use of information corresponding to the identified individual or an image of the identified individual. As discussed earlier the user records 332 through 338 corresponding to various individuals include information indicating authorized uses of information and/or images of the individuals to whom the records correspond, authorized services and/or authorized web sites for which the individuals have indicated their information and/or images may be used. Thus, once an individual is identified by the identification module 320 as discussed above, the determination module 320 uses the information in a user record corresponding to the identified individual to check the sharing preference/authorization information and determine whether the identified individual has authorized use of his/her information and/or images.

The response generation module 322 is configured to generate a response message, in response to the query, indicating whether or not the use of information and/or images of the identified individual is authorized. In some embodiments when the determination module 320 determines that the identified individual has not authorized use of his or her information and/or image the response generation module 322 is configured to generate a response message indicating the use of image of the identified individual is not authorized. In some embodiments the response generation module 322 includes an image modification/alteration module 323 configured to generate a modified version of an image of the individual, e.g., image included with the query. In some such embodiments the modified version of the image is included in the generated response message indicating the use of information and/or image of the identified individual is not authorized. In some embodiments the modified version of the image includes an alteration to a portion of the image which corresponds to the identified individual. In some embodiments the alteration of the portion of the image is performed by the image modification module 323 by blurring or blocking out of some of the portion of the image which corresponds to the identified individual. In some embodiments the alteration of the portion of the image is performed by the image modification module 323 by modifying or replacing at least a portion of the face of the identified individual in the image to render the individual unrecognizable in the modified version of said image.

In various embodiments the response generation module 322 is further configured to generate a response message indicating the use of information and/or image of the identified individual is authorized when the determination module 320 determines that the identified individual has authorized use of his or her image. In some such embodiments the response message indicating the use of information and/or image of the identified individual is authorized includes the unmodified image, e.g., as received in the query. In various embodiments the communications control module 326 is configured to control the transmitter 340 to transmit a response message generated by the response generation module 322 to a device, e.g., querying server or other node sending the query, in response to the query. As should be appreciated depending on the determination the response message may indicate either that use of individual's information and/or image is authorized or that use is unauthorized.

The report generation module 324 is configured to generate a report regarding received queries including images in which the identified individual was identified. In some embodiments the report generation module 324 is configured to generate the report after a predetermined time period, e.g., every 24 hours or 48 hours in order to provide a report to the customer once a day or once every two days. In some other embodiments the report generation module 324 is configured to generate the report after a predetermined number of queries corresponding to a given individual have been received. In various embodiments the communications control module 326 is configured to control the transmitter to send the report to a device corresponding to the identified individual.

The data/information stored in memory includes images received in a query 328, biometric information received in a query 329, and customer records 330. The biometric information 329 received in a query may include age, height, gender, weight, other biometric data including measurable physical characteristics including facial characteristics, face geometry, finger prints, retina patterns for retinal scan recognition, iris recognition patterns and/or other recognizable/measurable features. The measurable facial characteristics/features may include data indicating user features such as eye spacing, eye color, nose width etc. The information included in customer records 330 has been discussed above and is discussed in more detail with regard to FIG. 4.

In some embodiments the modules shown in FIG. 3 are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 3 example to be included in the memory 312, the modules shown included in the privacy control node 300 can, and in some embodiments are, implemented fully in hardware within the processor 308, e.g., as individual circuits. The modules can, and in some embodiments are, implemented fully in hardware, e.g., as individual circuits corresponding to the different modules. In other embodiments some of the modules are implemented, e.g., as circuits, within the processor 308 with other modules being implemented, e.g., as circuits, external to and coupled to the processor 308. As should be appreciated the level of integration of modules on the processor and/or with some modules being external to the processor may be one of design choice. Alternatively, rather than being implemented as circuits, all or some of the modules may be implemented in software and stored in the memory 312 of the privacy control node 300, with the modules controlling operation of the privacy control node 300 to implement the functions corresponding to the modules when the modules are executed by a processor, e.g., processor 308 In still other embodiments, various modules are implemented as a combination of hardware and software, e.g., with another circuit external to the processor providing input to the processor 308 which then under software control operates to perform a portion of a module's function.

While shown in the FIG. 3 embodiment as a single processor, e.g., computer, it should be appreciated that the processor 308 may be implemented as one or more processors, e.g., computers. When implemented in software the modules include code, which when executed by the processor 308, configure the processor 308 to implement the function corresponding to the module. In embodiments where the various modules shown in FIG. 3 are stored in the memory 312, the memory 312 is a computer program product comprising a computer readable medium comprising code, e.g., individual code for each module, for causing at least one computer, e.g., processor 308, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the privacy control node or elements therein such as the processor 308, to perform the functions of corresponding steps illustrated and/or described in the flowchart 200 and/or flowchart 600.

FIG. 4 illustrates an exemplary customer record database 400 including exemplary customer records corresponding to different users in accordance with one exemplary embodiment. The exemplary customer record database 400 may be used as the customer record database 132 of FIG. 1 and/or the customer record 330 of FIG. 3. In some embodiments the customer record database 400 is stored in the privacy control node 102/300. In some other embodiments the customer record database 400 including customer records may be stored externally at a secure site, with the privacy control server 102/300 being able to securely access, use, manage and/or maintain the customer record database 400.

The customer record database 400 includes customer records corresponding to a plurality of individuals/users including user 1 record 402, . . . , and user N record 420. Each of the customer records 402 through 420 includes customer user imposed use restrictions and/or sharing preference information corresponding to the individual/customer to which the record corresponds. The use restrictions and/or sharing preference information indicates authorized uses and/or restrictions on the use of user's information, e.g., biometric information including images of the individual or other biometric data such as fingerprints, voice samples, signature/handwriting sample, iris recognition sample, retina recognition sample or other such data. In some embodiments the use restrictions and/or sharing preference information further indicates authorized services and/or authorized web sites for which the individual has indicated his/her information and/or image may be used. The information stored in each of the user records may be received and/or obtained by the registration and management node 300 as part of the registration, e.g., enrollment, process in some embodiments, which is illustrated in flowchart 600 and discussed in detail below with regard to FIG. 6.

As shown, user 1 record 402 includes information corresponding to a first user including user name 403, user information 404, user provided sample image(s) and information 406, generated biometric templates 407, use and/or access preferences for images or facial recognition template 408 and use and/or access preferences for other biometric information corresponding to the user 414. The use and/or access preferences information is sometimes also referred to as sharing preference information.

The user name field 403 includes the name of the individual (e.g., JOHN SMITH in the example) to whom the user 1 record 402 corresponds. The user information 404 includes biometric data and/or other information corresponding to the user that can be used for identifying the user and may include, e.g., age, height, gender, weight, biometric information including measurable physical characteristics including facial characteristics, face geometry, finger prints, voice/speech sample for voice recognition, retina patterns for retinal scan recognition, iris recognition patterns and/or other recognizable/measurable features. The measurable facial characteristics/features may include data indicating user features such as eye spacing, eye color, nose width etc. It should be appreciated that such identification information can be and in various embodiments is used by the privacy control server 300 to identify an individual for whom a query with biometric information or extracted template is received. While in some embodiments the identification information data is provided by the user it should be appreciated that an average individual is normally not aware of the actual measurements and/or data indicating his/her physical characteristics discussed above. Thus, in such cases, e.g., where facial recognition is to be performed to confirm a user's identity, such biometric data including measurable physical characteristics of a user is generated in some embodiments by the privacy control node 102/300 based on information and/or sample images provided by the user or is obtained by the privacy control node 102/300 from a user approved third party service provider. In addition to or as part of the user information 404 the user 1 record 402 further includes one or more sample images 406 of the individual which may be used for identification and comparison purposes in accordance with the features of the present invention. The extracted recognition templates 407 includes templates extracted using biometric information 404, e.g., by performing additional processing on the biometric samples to extract features sets/data that can be used for comparison/matching against information received in queries. Thus, for each type of biometric data included in the biometric information 404 there is a corresponding template included in the extracted template 407, for example, fingerprint template, voice/speech template, signature/handwriting template, iris recognition template, retina recognition template etc.

Image sharing preference/authorization information 408, also referred to as use and/or access privilege information, include the sharing preference/authorization settings corresponding to the individual to whom the user 1 record 402 corresponds. The sharing preference/authorization information 408 indentifies authorized uses of images of the identified individual, authorized services and/or authorized web sites for which the individual has indicated his/her image may be used. In the illustrated example of FIG. 4 the sharing preference/authorization information 408 is shown in tabular form. Column 410 includes a list of authorized networks and websites which are authorized to use, e.g., post/publish images and/or information of the individual, i.e., user 1. As shown in column 410, in the illustrated example various websites/networks which are authorized to use images and/or information of user 1 include: Facebook, Twitter, Pinterest, Match.com, Google+, Tumblr, Career.com, Linkedin etc. Thus, if a server corresponding to any of these websites sends a query to determine if the use of the individual (e.g., user 1) image and/or corresponding facial recognition information is allowed the privacy control node 102/300 will likely respond with an approval/authorization to use based on the information specified in column 410. In some embodiments if a network, service provider and/or website, which is included in the list of user authorized networks/websites such as the list shown in column 410, frequently sends queries to the privacy control node 102/300 for authorization approval then the privacy control node 102/300 may, and in some embodiments does, send a response with an authorization approval that also indicates that the network/website is on an authorized list and thus need not send queries again and again. If the user changes his/her preferences that modifies the list in column 410, e.g., removing ones or more of such previously authorized networks/websites from the list, then the privacy control node 102/300 may then send a message to these networks/websites the user authorized network/website list has changed and thus these networks/websites need to resume querying the privacy control node 102/300 for approval.

Column 412 includes a list of authorized uses of the individual's images and/or information. As shown in column 412, in the illustrated example authorized uses of the individual's (user 1) images and/or information include: for use in social networking on a group and/or on social networks including popular social networking websites; for use in professional networking; for use on dating websites and/or dating groups; for use in social work/non-profit projects including social work/non-profit websites and/or groups; for use in employment related/job hunting networks and websites; for use in humanitarian work related projects including humanitarian work promoting websites and/or groups; for use by political campaigns supported by the individual; for use in community service related projects including community service promoting websites and/or groups etc.

Use and/or access preference/authorization information 414 includes authorized uses and restrictions regarding various other types (e.g., other than image/facial recognition information) of biometric information and/or templates corresponding to the user that are stored in user record. Similar to the information set 408, the use and/or access preference/authorization information 414 identifies authorized uses of each of the other types of biometric data corresponding to the user stored in user record, e.g., as information 404 and/or 407. Column 415 includes various types of stored biometric samples and/or numerical templates while column 416 includes information indicated authorized uses and/or access preference corresponding to these biometric samples and/or numerical template.

Consider the first row of columns 415, 416. The first entry in column 415 identifies the biometric information and/or template which in the present example is handwriting and/or signature data, e.g., sample or corresponding template. The corresponding entry in the same first row of column 416 indicates the authorized uses set by the user for the handwriting and/or signature data which in the present example is indicated to be "financial transactions and identity verifications". Thus, it can be appreciated that the user has authorized that his/her handwriting/signature samples or templates extracted therefrom can be used for resolving requests relating confirmation of user's identity and/or financial transactions in which verification of user's signature or writing patterns is needed. For example, a bank may request signature or handwriting verification from the registration and management entity 300, e.g., upon receiving a check with user's signature or as another example when the user inputs his/her signature in person using a touch sensitive interface like the ones seen in many banks, to verify the signatures and/or identity of the user by matching signatures.

Similarly consider the second row of columns 415, 416. The second entry in column 415 identifies the biometric information and/or template as "fingerprint data", e.g., fingerprint sample or corresponding template. The corresponding entry in the same row of column 416 indicates that the authorized uses for fingerprint biometric data is "site/object access". Thus, the stored fingerprints and/or corresponding template is authorized to be used for resolving requests related to access of objects such as electronic devices, e.g., laptops, phones, tablets and/or other machines, as well as access to physical sites, e.g., restricted buildings, vehicles, entry doors etc., which require match of fingerprints prior to granting access to such objects/sites. Continuing with the example consider the third row of columns 415, 416. The third entry in column 415 identifies the biometric information and/or template as "retina/iris data", e.g., retina/iris recognition pattern sample or corresponding extracted template. The corresponding entry in the same row of column 416 indicates that the authorized uses for this biometric data is again "site/object access". Similarly, the last entry in column 415 identifies the biometric information and/or template as "voice/speech data", e.g., voice/speech sample or corresponding extracted template. The corresponding entry in the same row of column 416 indicates that the voice/speech data can be used for resolving requests pertaining to identity verifications as well as site/object access.

In various embodiments the registration and management node 300 can not use or allow the use of user's biometric information for anything beyond what the user has authorized it to do. In some embodiments the user may allow the use of stored biometric information for all identification and verification purposes but with certain specified exceptions that the user indicates by providing special instructions. Such special instructions and/or restrictions are also stored in the user record in some embodiments in addition to or as part of information sets 408 and 414.

In some embodiments in addition to the authorized uses of images of the identified individual (such as those included in column 412) and authorized services and/or authorized web sites (such as those included in column 410) for which the individual has indicated his/her image may be used the user records 402, 420 further includes information indicating specific unauthorized/prohibited websites and uses for which the individual has indicated his/her image can not be used. For example, a list of unauthorized/prohibited websites including adult websites that host graphic content may be included in the user records 402, 420. Similarly, a list of unauthorized/prohibited uses of the user's image may also be specified including, for example, use in advertising/marketing, use on an adult/porn site, use on a race supremacy website or group etc. Furthermore, in some embodiments the user record 402 further includes information indicating a list of persons, groups, entities that are authorized to use, e.g., post, publish and/or share online, the individual's image on one or more websites, e.g., social and/or professional networking websites. Such persons, groups, entities may be identified by name and/or some other identifier. User N record 420 may include similar information corresponding to the individual to whom the user N record corresponds, i.e., user N.

Figure 5:
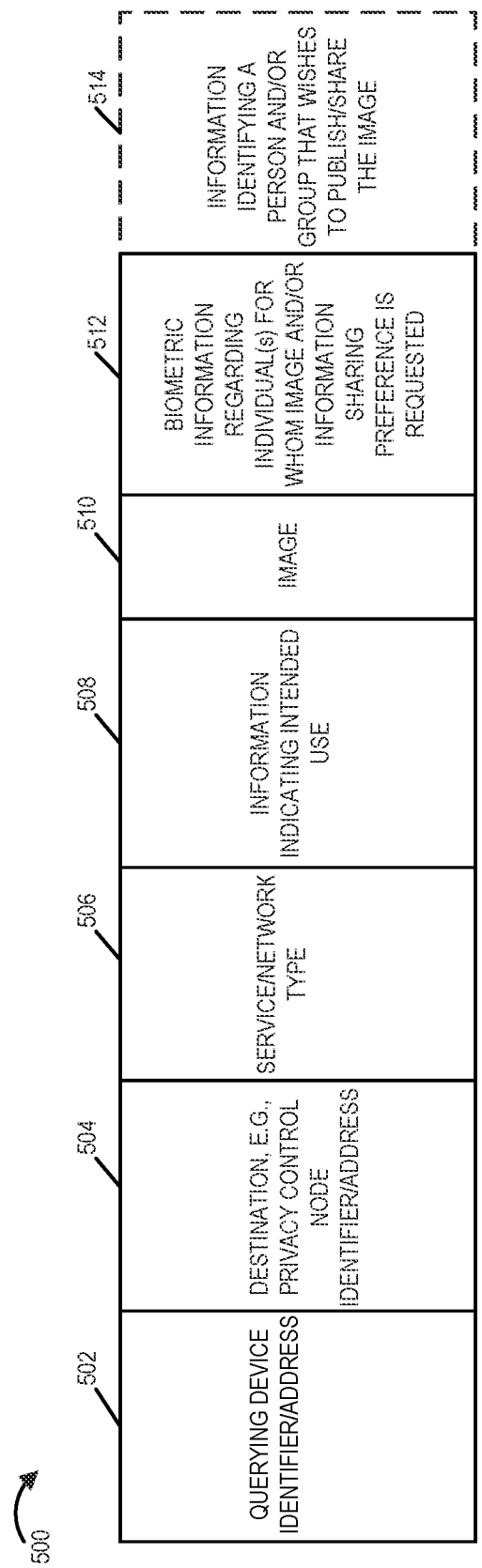
FIG. 5 illustrates an exemplary query sent from a querying device to the exemplary privacy control server, in accordance with one exemplary embodiment.

FIG. 5 illustrates an exemplary query 500 sent from a querying device to the exemplary privacy control server 300/102, in accordance with one exemplary embodiment. In some embodiments the query 500 includes information and one or more images of an individual for checking by the privacy control node 102/300 to determine if the images or other information communicated by the query 500 corresponds to a user who has restricted use of his/her image or other information in a public manner. The query 500 includes a querying device identifier field 502, a destination identifier/address field 504, service/network type field 506, an intended use field 508, an image 510, biometric information regarding the individual for which authorization information is requested 512, and information identifying a person or group that wishes to publish/share the image of the individual 514. While image 510 and biometric information 512 are separately shown in the example of query 500 however the biometric information received in a query may actually include an image of the individual. Thus, in some embodiments the image field 510 is optional. The information field 514 of the query 500 is optional and thus may not be used in a query in all embodiments.

The querying device identifier field 502 includes identification information corresponding to the querying device sending the query 500. The identification information in field 502 may include, for example, domain name of a network/service associated with the querying device, an actual IP address and/or other address, a URL (Uniform Resource Locators) or another identifier corresponding to the querying device/server via which the querying device/server can be identified and/or contacted. The destination identifier/address field 504 includes identifier and/or address information corresponding to the final destination device, e.g., the privacy control node 300. The destination address may include IP address and/or other address of the destination device to which the query 500 is directed and may be used for routing the query 500 via one or more intermediate nodes.

The service/network type field 506 includes information indicating the type of service and/or type of network with which the querying device is associated. For example, the service/network type field 506 may indicate that the type of service and/or type of network associated with the querying device is a social network such as Facebook, a professional network such as Linkedin, a dating service such as match-.com or the like. In some embodiments the privacy control node 102/300 receiving the query 500 can infer a potential use of an individual's image from the information in field 506 even if an intended use in not specified in the query.

The intended use field 508 includes information indicating the intended use of the image included in field 510. The intended use may include use for, e.g., one of: commercial purposes, advertising/marketing purposes, social networking/sharing with a plurality of individuals on a social network, professional networking purposes, for use on a dating site or group, for use in social work, non-profit, community service and/or charity related projects etc. The image field 510 includes at least one image of the individual who is the subject of the query, e.g., for which it is to be determined whether the use of the image and/or information corresponding to the individual is authorized.

Biometric information field 512 includes biometric data corresponding the individual(s) for whom image and/or information sharing preference is requested to determine if the use of image and/or information is authorized. The biometric information 512 may include, for example, actual name and/or username, age, gender, height, weight, other biometric data including measurable physical characteristics including facial characteristics (e.g., such as data indicating user features such as eye spacing, eye color, nose width etc.), face geometry, finger prints, retina patterns for retinal scan recognition, iris recognition patterns and/or other recognizable/measurable features and/or other information corresponding to the individual. The information included in field 512 can be used by the privacy control node 102/300 to identify the individual, e.g., in order to look up corresponding customer record in the database 400.

Information field 514 includes identification information identifying a person, entity or group that wishes to publish/share the image 510 and/or biometric information 512 of the individual. In some embodiments where identification information field 514 is used the information may include the name of a person or a group that wishes to use the image 510 and/or information 512 on the network/website associated with the querying device sending query 500. For example, consider that the querying device is a social networking website server that is not included in the authorized list 410 of FIG. 4 and the information field 514 indicates that a person, e.g., named "Michael Hart", wants to post the image 510 and/or use information 512 corresponding to the individual included in the query 500 on the social networking website identified in field 502 or field 506. In such a case using the privacy control node 300 checks if the name "Michael Hart" is specified in the user 1 record 402 as a person, group, or entity that is authorized to use, e.g., post, publish and/or share online, the individual's image on one or more websites. If there is a match, then the privacy control node 300/102 sends an approval for use of the image 510 to the querying device.

Figure 6:
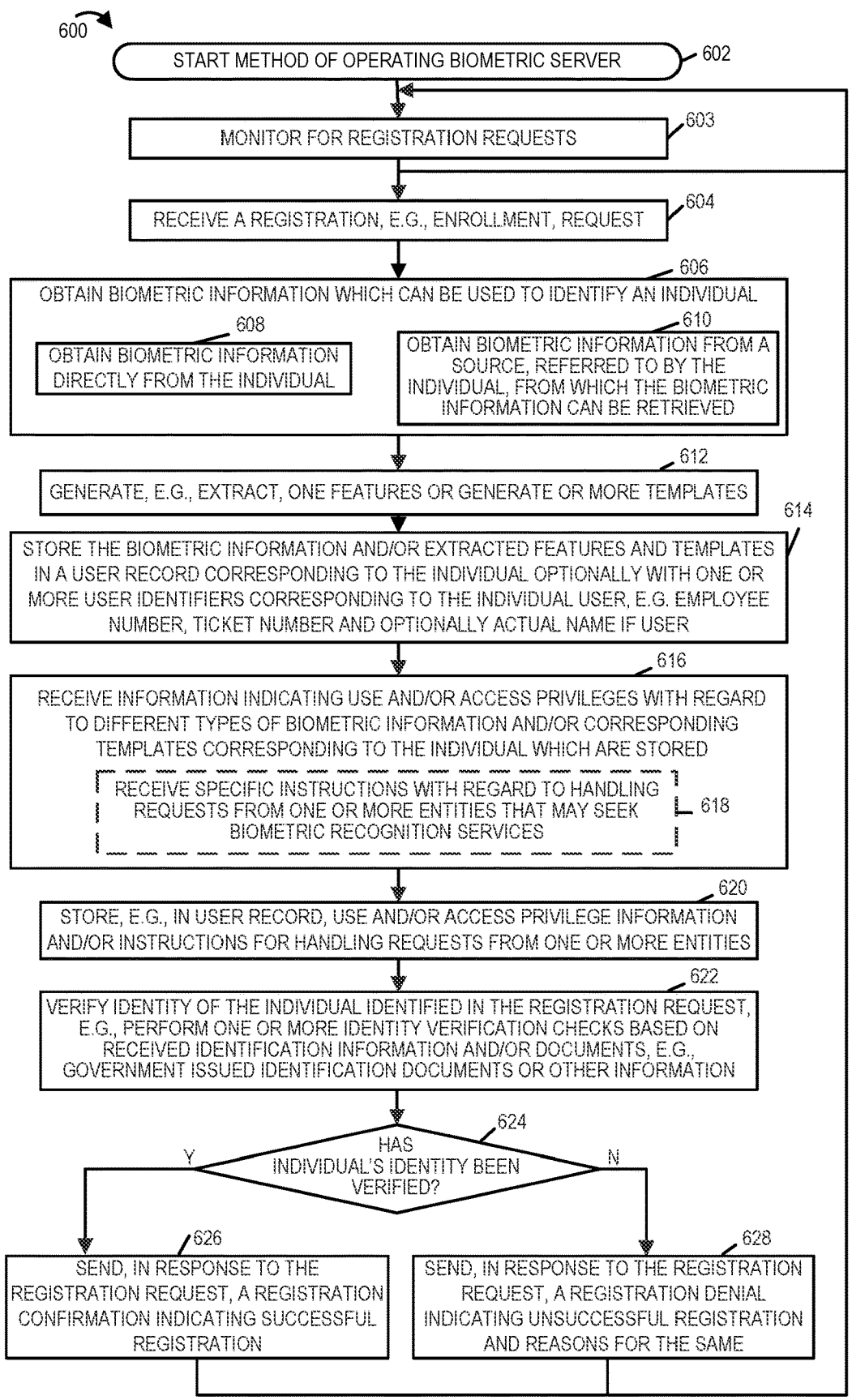
FIG. 6 is a flowchart illustrating the steps of an exemplary registration, e.g., enrollment, method implemented by the exemplary registration and management entity, e.g., a biometric server such as the one shown in any of the other figures, in accordance with an exemplary embodiment.

FIG. 6 is a flowchart 600 illustrating the steps of an exemplary registration, e.g., enrollment, method implemented by the exemplary registration and management entity 300/102 in accordance with an exemplary embodiment. In various embodiments the method 600 is implemented by a biometric server sometimes also referred to as a privacy control node or biosecurity server. Elements 300 and 102 shown in various figures are exemplary of such a server.

The exemplary method starts in step 602 with the registration and management entity, e.g., biometric server, 300/102 being powered on and starting to monitor for registration requests, e.g., request to enroll. Using the method of flowchart 600 various users are enrolled/registered with the privacy control node/registration and management entity 300/102 which collects biometric samples corresponding to individuals during this process, extracts features and/or generates templates for future comparisons, e.g., recognition operations, and stores the received biometric samples and/or recognition templates also sometimes referred to as numerical templates. The biometric information (and corresponding template(s)) include, in some embodiments, the same type of information as discussed earlier, e.g., as with regard to user records of FIG. 4. In the case of the user records one or more user identifiers maybe and sometimes are included. In some embodiments and/or for some applications the actual name of the user is not stored but rather another identifier such as an employee number or ticket number. In such a case the actual identity of the user to which a generate template corresponds may not be, and in some embodiments is not, stored in the biometric server 102 or 302.

Operation proceeds from start step 602 to step 603. In step 603 the privacy control device 300/102 monitors for registration requests. Operation proceeds from step 603 to step 604. In step 604 the privacy control device 300/102 receives a registration, e.g., biometric service enrollment, request from a user device corresponding to an individual. The user device maybe and sometimes is a cell phone with image capture and/or mic capability due to the presence of a camera or mic. The registration request indicates a user's request to have his/her biometric information stored and used for one or more services or business or other purposes. The request also includes identification information, e.g., one or more user identifiers to be stored and managed by the control node 300/102 in accordance with the user's indicated preferences and/or restrictions. The registration request may be sent by the individual intending to create a biometric information profile or by the parent or guardian in case of a minor.

Operation proceeds from step 604 to step 606. In step 606 the privacy control server 300/102 obtains biometric information (and/or corresponding template) corresponding to an individual. The biometric information is in some cases an image of the user registering, a voice sample and/or handwriting sample or other information. In some embodiments step 606 is performed as part of step 604 of receiving the registration request. The biometric information maybe captured and provided by the user device used to register. Depending on the case and availability of such information one of the steps 608 or 610 is performed in some embodiments as part of step 606. In some embodiments step 608 is performed where the registration and management node obtains the biometric information directly from the individual, e.g., the user to whom the registration request corresponds, e.g., separately or as part of receiving the registration request. In some other embodiments step 610 is performed wherein the biometric information and/or corresponding template is obtained from a source, e.g., a third party, referred to by the sender of the registration request. In some such embodiments the user sending the registration request may provide identifying credentials and/or information that would allow the registration and management entity 300/102 to obtain the biometric information corresponding to the user from the third party and an IP address where the third party can be contacted to obtain the biometric sample.

Operation proceeds from step 606 to step 612 where the registration and management entity 300/102 extracts features from the received biometric samples and generates one or more templates, using obtained biometric information, which can be used to perform biometric identification operations. Thus, the received biometric information and/or features and templates generated therefrom can be used to identify an individual and/or to confirm the identity of the individual, e.g., in response to queries from one or more entities, e.g., employer systems, theme park systems, home alarm systems, building access control systems etc., such as system 104, 106, 108 etc. It should be appreciated that step 612 is performed in some embodiments where captured biometric information, e.g., raw biometric samples, are obtained in step 606. In the cases where the node 300 receives extracted numerical templates instead of biometric samples there is no need to perform step 612 and in such cases step 612 maybe and sometimes is skipped.

Operation proceeds from step 612 to step 614. In step 614 the obtained biometric information and/or extracted features and/or templates are stored in a user record corresponding to the individual, e.g., such as user record 402. In some embodiments a user record is created by the biometric server also referred to as a registration and management entity 300/102, if one already doesn't exist in the customer database 330 for the individual. One or more user identifiers corresponding to the registering individual are included in the customer record corresponding to the individual but the user's actual name need not and is not included in some embodiments or for some applications. Operation proceeds from step 614 to step 616. In step 616 the node 300/102 receives information indicating use and/or access privileges with regard to one or more different types of biometric information and/or corresponding templates corresponding to the individual which are stored. In some embodiments the user and/or entity representing the user provides, e.g., on its own or in response to an opportunity given by the registration entity 300/102, use and/or access privileges with regard to the one or more different types of stored biometric information and/or corresponding templates. The use and/or access privileges (also sometimes referred to as information sharing or use preferences) for a given type of biometric modality, e.g., image/facial recognition data, fingerprints, signature sample, voice sample etc., providing preferences and/or restrictions set by the user or the handler (e.g., legal guardian or representative) as how the given type of biometric information can or can not be used. In some embodiments a user and/or the user's representative sets access restrictions and also restrictions on when biometric information of the given type can be used by another entity. For example, the use and access information may indicate that handwriting/signature samples and/or templates can be authorized for use with regard to checking credit card, check and/or other financial transactions but not for other purposes. It may be specified that fingerprint information may be authorized by the user for access to objects such as electronic devices or actual physical sites but not for general distribution or for other purposes, images maybe authorized for use for non-commercial purposes such as on Facebook and/or other websites but not for commercial purposes. Handwriting/signature samples and/or templates can be authorized for use with regard to checking credit card, check and/or other financial transactions but not for other purposes. In addition to being able to set specific uses for specific types of information the user can also restrict such uses to particular entities. For example, the user may specify that signature and/or writing information is authorized for use by banks and/or credit card companies explicitly specified by the user, e.g., ones used by the user, but not other entities, e.g., lenders, credit unions, brokers etc. In some embodiments as part of step 616 sub-step 618 is performed where the node 300/102 receives specific instructions regarding handling queries/requests from one or more specific entities that seek biometric and/or identity recognition assistance. For example, the user can specify that any request for identity verification through the use of stored biometric information from a government agency should be denied. As another example the user can specify that any request for use of images from an adult/explicit content hosting website server should be denied.

Operation proceeds from step 616 to step 620 where the node 300/102 stores, e.g., in the user record corresponding to the individual, received use and/or access privilege information and the instructions for handling the requests from one or more specific entities. In some embodiments the user record is maintained in some embodiments in or under the control of the biometric server 300/102 and not provided to business systems which interact with the biometric server. In this way, in some embodiments the biometric server 300/102 is responsible for compliance with regulations relating to the storage of personal information, biometric information, and the business systems using the biometric server need not worry about or directly handle compliance requirements.

In some embodiments the method includes steps 622 to 628 which are optional and not required for all embodiments. In cases where steps 622 to 628 are not performed operation proceeds from step 620 directly back to step 626 and then back to step 603 as the monitoring and processing of registration requests is performed on an ongoing basis.

Operation proceeds from step 620 to step 622. In step 622 the registration node 300/102 verifies the identity of the individual identified in the registration request or to whom the registration request corresponds, e.g., by performing one or more identity checks using received identification credentials. The identification credentials may be in the form of information provided along with the registration request such as driver license number, social security number, name, address etc. and/or any combination of such information which can be used to verify that the individual is actually who he/she claims to be. The identification credentials may also be in the form of actual documents corresponding to the registering individual, e.g., such as government issued documents such as verified/certified copies of one or more of driver's license, passport pages, birth certificate, band issued ATM card etc. The identification credentials may be received as part of the registration request or may be requested by the node 300 separately.

Operation proceeds from step 622 to step 624 where the registration and management entity 300/102 determines whether the identity of the individual requesting registration has been verified in the manner discussed above. If the identity has been verified the operation proceeds from step 624 to step 626. In step 626 the registration and management entity 300/102 sends, in response to the registration request, a registration confirmation indicating successful registration of the individual and corresponding biometric data with the registration and management entity 300/102. If in step 624 it is determined that the identity of the individual can not be verified, e.g., due to lack or insufficient identification credentials, the operation proceeds from step 624 to step 628. In step 628 the registration and management entity 300/102 sends, in response to the registration request, a registration denial indicating unsuccessful registration and optionally also providing reasons for the denial. Operation proceeds from step 626 or step 628 back to step 603 where the registration and management entity 300/102 monitors for additional registration requests and the process may be repeated for additional received registration requests.

Figure 7:
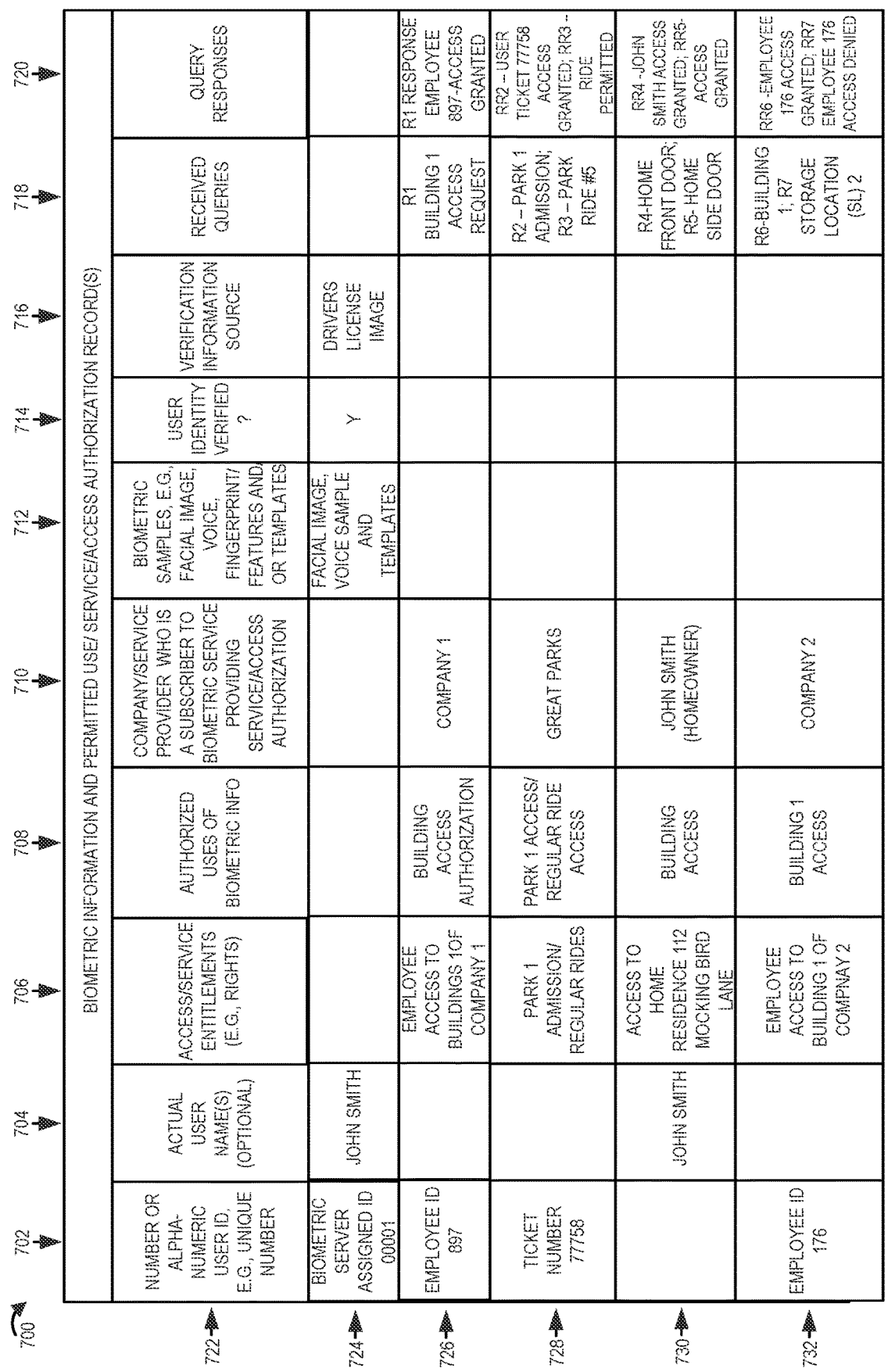
FIG. 7 illustrates an exemplary database record that is maintained and used by the biometric server of FIG. 1 in some embodiments.

FIG. 7 illustrates an exemplary customer record 700 which is created as part of a user registration process and which is maintained and updated over time for user 1. The biometric server 102/300 stores multiple records of the type shown in FIG. 7 corresponding to different individual users and the record 700 is intended to be exemplary.

The record 700 includes various type of information shown in columns 702, 704, 706, 708, 710, 712, 714, 716, 718, 720 and corresponding rows 722, 724, 726, 728, 730, 732. Row 722 includes headings for each of the information columns and provides an indicator of the type of information included in the corresponding column under a heading. Row 724 includes various information/data including a biometric server assigned identifier in column 702, the actual name of the user to which the record corresponds in column 704, biometric samples, features and/or templates in column 712 which can be used for multiple businesses and/or different types of identification operations (e.g., voice, image based, handwriting based), information indicating whether the user's actual identity has been verified in column 714 and information indicating the source of the verification information in column 716.

Rows 726, 728, 730, 732 include information relating to different businesses or systems which may use the information stored in the record as part of a biometric identification and/or authorization service provided by the biometric server 102/300. For example, Row 726 includes in column 702 an employee identifier used by Company 1 to identify the user to which the record 700 corresponds. This number is returned as a user identifier in response to a query from company 1 including an image of the user to which record 700 corresponds. Column 706 is optional and is used in embodiments where the biometric server indicates in a query response if an action, service or access is authorized, e.g., based on information from the company to which the row of information corresponds. Row 726 includes information relating to Company 1 where the user is known and identified as employee 897. The authorized use of the biometric information allowed by the user to which record 700 corresponds is for controlling building access as shown in column 708 while the company provided information in row 706 indicates the user is allowed to access building 1 of company 1. Row 7726, column 718 includes a list of received queries that were received from a company 1 system while column 720 includes a list of the query responses. Received query R1 from company 1 was seeking access to building 1 and included an image of John Smith as determined from using the stored information, e.g., a template used for image recognition, to identify the user. The response to query R1, R1 Response, shown in column 720 identifies the individual recognized in the query image as Employee 897 and indicated that access to the building identified in the query message should be granted. In system where the record 700 does not includes access/service/entitlement information for the company sending the request, the recognized user will be identified in the response query using the identifier used by the company, e.g., Employee ID 897 but it will be up to the company system to then decide what action to take, e.g., allow or deny access, based on information stored in the Company 1 system and associated in the company's system with the identified user, e.g., employee 897 in this example. By maintaining a record of receive queries and corresponding responses corresponding to users identified as part of processing an image or other biometric information received in a query, a record of the identified user's activities, e.g., access and service attempts and the corresponding responses is maintained and easily accessible by company 1 and/or the user with the company, e.g., company 1, potentially controlling whether or not the user is allowed to access the record of company made queries and corresponding responses.

Row 728 includes a ticket number that is used as a user identifier by Park 1 140. The park may not know of be provided with the actual name of the user with the ticket number serving in some embodiments as the user identifier for theme park 1.

Row 730 corresponds to a portion of the record used by the individual user, John Smith, to control access to his home with the user's home security system making queries and providing images to the biometric server to determine if access is granted or denied to the user's residence. As in most cases if an authorized individual with rights to access a location, e.g., home, is not detected in an image received as part of a query from the home security system access to the residence will be denied.

Row 732 includes information corresponding to Company 2 which is a second company at which John Smith is an employee. At Company 2 John Smith is know as employee number 176 and he is authorized to access Company 2's building number 1. Column 718 shows a request, R6, in which employee 176 tried to access building 1 of Company 2 and another request R7 in which employee 176 tried to access storage location SL2. In column 720 it can be seen that employee 732 was granted access to Company 2, Building 1 after being identified but was denied access to SL2 since he was not authorized to access the storage location.

Figure 8A:
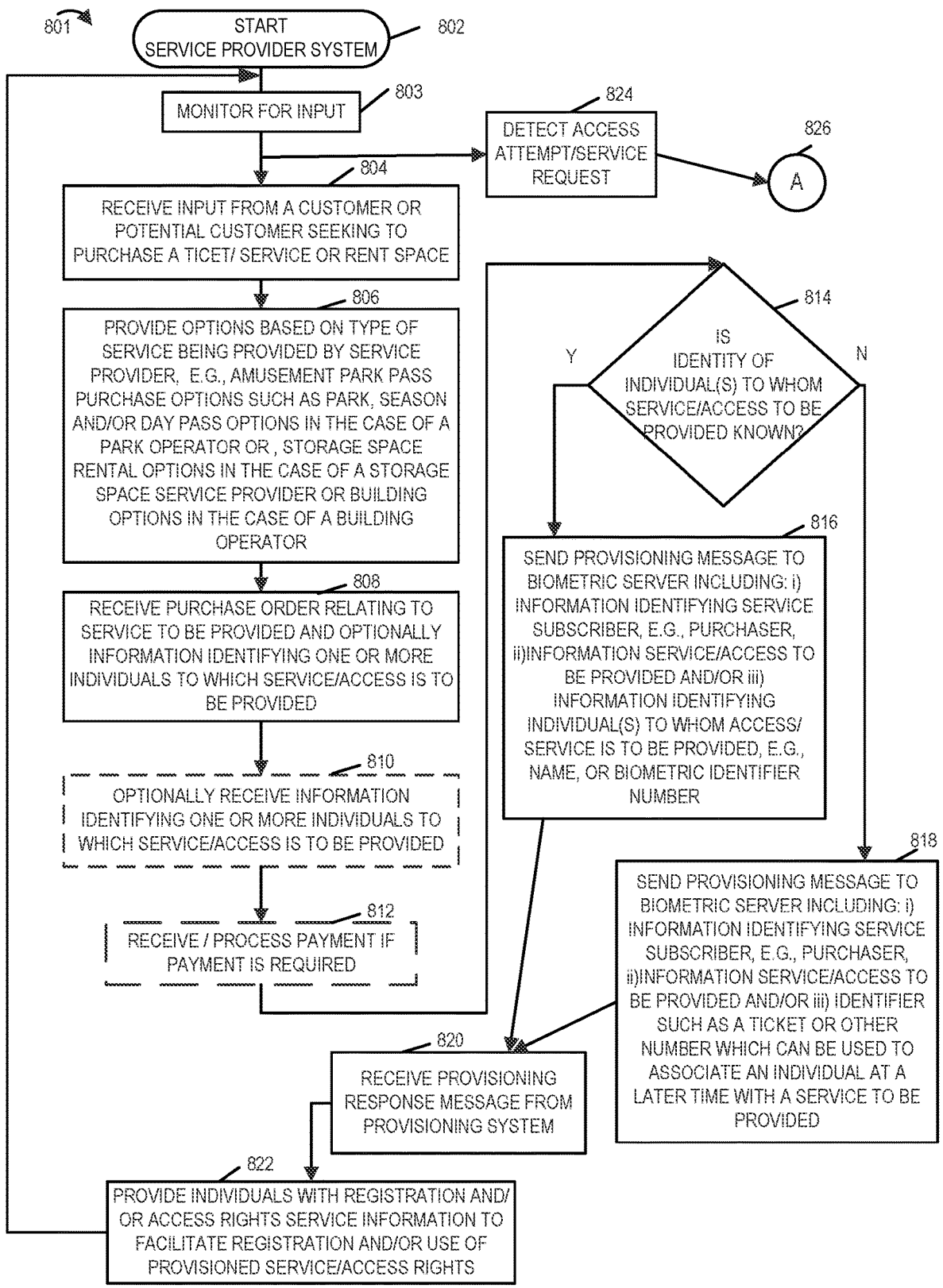
FIG. 8A shows a first part of a flow diagram showing the steps of a method implemented by a service provider system such as the park security and ticket purchasing system 138 or 140 of FIG. 1.
Figures 8, 8A, 8B:
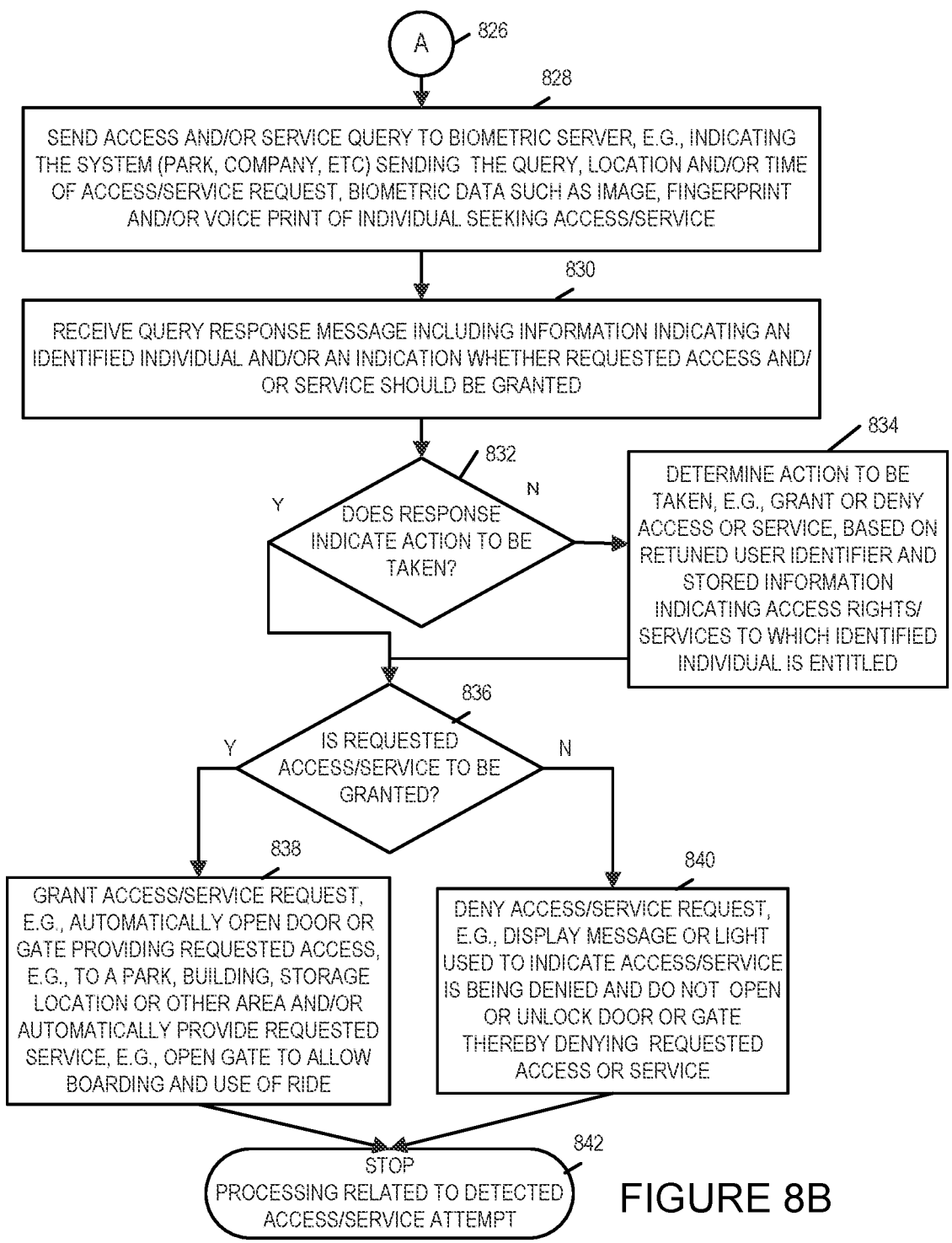
FIG. 8B shows a second part of a flow diagram showing the steps of a method implemented by a service provider system such as the park security and ticket purchasing system 138 or 140 of FIG. 1.
FIG. 8 is a diagram showing how the steps FIGS. 8A and 8B can be combined to form a complete flow diagram.

FIG. 8 is a diagram 801 which shows how FIGS. 8A and 8B can be combined. FIG. 8, which comprises the combination of FIGS. 8A and 8B, shows the steps 801 of an exemplary method that is implemented in some embodiments by a service provider or other system of a company that uses the biometric server 102/300 for biometric identification and/or authorization services. The method 800 is used for ticket and related sales as well as for access control. Ticket/service/rental purchases may be made by accessing the system via the theme park or other business system via the Internet will access or service authorization request can be made by allowing biometric information used to support a query to be captured, e.g., by standing in front of a camera at a door or gate which controls access to a location or service such as a park ride. The method 800 maybe implemented by theme park 1 security and ticket/pass system 140, theme park 2 security and ticket/pass system 138, U store self storage enteral system 136 and/or the home residence security system 134. Each of such systems includes a sensor for sensing a user, e.g., a camera, processor, memory, communications interface (e.g., including a receive and transmitter) and a control device, e.g., access control device such as automated door lock. Users seeking to buy tickets can access one of the systems to purchase a park ticket or rent a storage space for example where the ticket or storage space can then be authorized to be used by a corresponding individual. The processor controls the system to implement the steps of the method 800.

The method 801 starts in step 802 with the service provider system, e.g., theme park operation system 138 or 140, being powered on and monitoring for customer inquiries, e.g., entered via the Internet and provided to the service provider system via its communications/network interface. Operation proceeds from step 802 monitor for input step 803. Monitoring for input is preformed on an on going basis and operation proceeds to step 804 when there is input from a customer and to step 824 when there is an access attempt, e.g., attempt to access an area or building, or a service request, e.g., request to receive a service at a theme park to which a user is entitled such as a ride or other service.

In step 804 input is received, e.g., via the Internet or another network connection, from a customer or potential customer seeking to purchase a ticket, service or rent space such as a storage location at a self store storage facility. Operation proceeds from step 804 to step 806 in which the system provides options to the user, e.g., by displaying them on the user's device via the Internet. The options provided to the user may include purchase or a ticket, amusement park pass, off to allow the user to rent a storage space or building, etc. Then in step 808 in response to providing the user option information the system received purchase order information in step 808 relating to a service, ticket, storage and/or storage location being purchased or rented. The purchase order information includes in some but not all cases, information identifying one or more individuals for which the ticket or pass is being purchased and/or who are to have access to a rented storage location or building. Step 810 is shown as an optional step in which information identifying one or more individuals to which services or access is to be provided is received separately from the purchase order information. In optional step 812 a payment is received/processed. Operation proceeds from purchase step 808 to step 814 via steps 810, 812 when they are implemented or directly to step 814 when these steps are not implemented.

In step 814 a determination is made as to whether the identity of the individual(s) to whom service/access is to be provided is known, e.g., service from information provided at the time of purchase. If the answer is yes, operation proceeds to step 816 otherwise operation proceeds to step 818. In step 816 a provisioning message is sent to the biometric server 102/300 providing information i) identifying one or more service subscribers, e.g., the purchaser, ii) information about the service or access to be provided and/or iii) information identifying one or more individuals to whom access/service is to be provided where this information may include, e.g., the name of the individual and/or a biometric identifier number used by the biometric server in a customer record. Operation proceeds from step 816 to step 820.

In step 814 if it is determined that the identity of an individual to whom service/access is to be provided, e.g., as a result of a ticket purchase, operation proceeds to step 818. In step 818 a provisioning message is sent to the biometric server, e.g., from the park or other system used to make the ticket or other purchase. In step 818 the provisional message includes i) information identifying a service subscriber, e.g., the ticket or rental purchaser, ii) information indicating the service or access to be provided based on the purchase and/or iii) an identifier such as a ticket number or other number which can be used to associate an individual at a later time with a service to be provided as a result of the purchase. That is later a user can register with the biometric server using the ticket number for instance as an identifier and thereafter associate biometric information with the ticket number to obtain the purchased service or access in some cases without having to disclose the real name or identify of the individual who will be using the ticket. Operation proceeds from step 818 to step 820. In step 820 a response is received form the biometric server 102/300 which is operating as a provisioning system.

Operation proceeds from step 820 to step 822 in which the purchaser and/or individuals who are entitled to received services or obtain access are provided by e.g., email with registration and/or access rights service information to facilitate registration and/or user of the purchased services or leased space. In some cases, the Email provides a link to the biometric servicer which can be used access the biometric servicer and register/provide biometric information. Thus, based on the information supplied in step 822 a ticket holder or person for which a ticket is purchased can register with the biometric server. In some cases, the registration uses a ticket number or other identifier as the user identifier so that the user can associate biometric information with the ticket or purchaser but without necessarily having to disclose personal information such as their name or address. Thus, a single individual may be limited to using a ticket but a ticket, in some cases, can be used without associate an actual person's name with the ticket.

Operation is shown proceeding back from step 822 to monitoring step 803 to show that the process is ongoing with purchases and access requests, or service requests being supported on an ongoing basis.

If in step 803 the monitoring detects and access attempt or service request, e.g., an individual seeking to use a park ticket or season pass that was purchased to access the park, a ride or obtain a service or a renter trying to access a rented location with an access control device, operation proceeds to step 824 in which an access attempt or request for service is detected. Operation proceeds from step 824, via connecting node 826 to step 828 of FIG. 8B.

In step 828 an access request is sent from the park or other business system 138, 140, 136, 134 sends an access and/or service query to the biometric server 102/300, e.g., indicating the system sending the query, e.g., park or company sending the query along with other information such as the location and/or time of the access/service request, captured biometric data such as an image, figure print, and/or voice print of the individual seeking access or service. The image maybe, for example, an image captured by a camera at a park access point or ride entrance. In step 830 a response is received from the biometric server 102/300. The response identifies the individual seeking access or the service by a number, alphanumeric sequence, and/or name when an individual is identified based on the provided biometric information and/or the query response indicates that service or access should be granted or denied. If the biometric server 102/300 is unable to identify the individual seeking access or service the response will deny the service or access and in some cases indicate that the individual seeking access/service could not be identified.

Operation proceeds from step 830 to step 832 in which a determination is made as to whether the received response indicating an action to be taken, e.g., that a service or access should be granted or denied. If such action information is not included in the response operation proceeds to step 834 in which the park or other system receiving the response determines the action to be taken based on the user identifier in the response that indicates the individual that was identified by the biometric server and based on stored information indicating access rights and/or service rights of individuals, e.g., employees, ticket or pass holder etc. In embodiments where the system which sent a biometric query determines based on the identifier returned in response what action to take the system receiving the response, e.g., park access control system, normally stores user identifier and rights information relevant to the park or system which is the same or similar to that shown in columns 702, 704, 706, 708, 710 but with the information being stored being relevant to the system making the access determination and not other companies or other parks. If no individual is identified in the biometric server response, in step 834 access or service is denied due to the failure to be able to identify the individual seeking access or service.

With a determination as to whether the requested access or service should be granted or denied having been made in step 834, operation proceeds to step 836. Similarly, if the response from the biometric server indicated the action to be taken operation proceeds from step 832 to step 836. In step 836 the step to proceed to is determined based on whether access/service is to be granted to the individual which triggered the query to the biometric server. If access is not to be granted, operation proceeds form step 836 to step 840 in which the access/service request is denied. This involves in some cases indicating that access is being denied by flashing a red light or other indicator and keeping a look on a gate or door used to enter the area to which access is being denied locked. Operation proceeds from step 840 to step 842.

In step 836 if access or service is to be granted, operation proceeds to step 836 in which access or service being sought is granted, e.g., a door to the restricted area is automatically opened and/or a gate allowing access to a ride or other service is opened. Operation proceeds form step 838 to stop step 842 with the processing of a particular access or service request having been completed. However, it should be appreciated that new access/service request can be detected and processed on an going basis.

Figure 9:
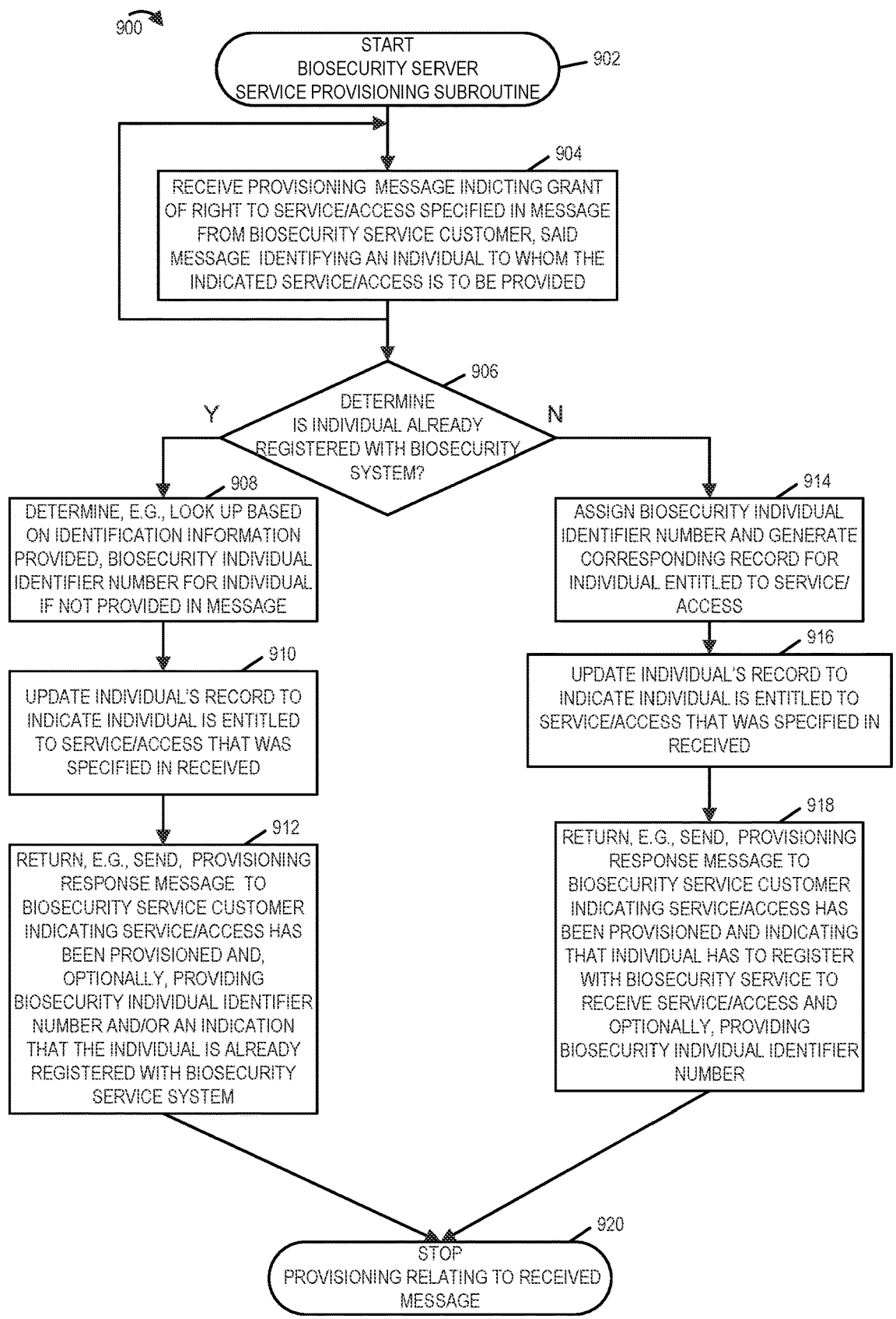
FIG. 9 illustrates an exemplary biometric server provisioning routine.

FIG. 9 illustrates the steps 900 of exemplary biometric server provisioning routine implemented in accordance with one exemplary embodiment. The routine 900 can be implemented by the biometric server 102 or 300 shown in one or more of the other figures.

The biometric server provisioning routine 900 beings in start step 902 with the biometric server 102 or 300 implementing the routine. Operation proceeds from step 902 to step 904 in which a provisioning message is received e.g.,, from a business system such as park system 140, indicating that a grant of a right to obtain a service or access indicated in the providing message has been acquired by an individual, e.g., as the result of a ticket purchase, rental of a storage space or by some other mechanism. Thus in at least some cases, the provisioning message received in step 904 is received from a business system which will also send biometric queries to identify an individual for purposes of determining if it is the individual entitled to access an area or receive a service. The individual may be identified in the provisioning message by a ticket number, pass number, employee number or name for example which can be used as an identifier of the individual entitled to access an area or receive a service. Operation proceeds from step 904 to step 906 but is also shown proceeding back to step 904 to indicate that provisioning messages can be received on an ongoing basis.

In step 906 a determination is made as to whether the individual identified in the provisioning message received in step 904 is already registered with the biometric server, e.g., if a record corresponding to the identified individual already exists. If a record does not already exist, a biosecurity individual identifier number is assigned, e.g., randomly or pseudo randomly, and a record is created for the individual. Then in step 916 the record is updated to indicate the service or access rights to which the individual identified in the received provisioning message is entitled to receive, e.g., the service or access rights indicated in the provisioning message. FIG. 7 shows a customer record of the type which may be created in step 914. Operation proceeds from step 916 to step 918 in which the biometric server 102/300 returns a provisioning response message to the system that sent the provisioning message indicating that service/access has been provisioned and optionally providing the biosecurity individual identifier number assigned to the individual. Operation then proceeds to stop step 920.

If in step 906 it was determined that the individual indicated in the provisioning message received in step 904 is already registered, e, g., there is an existing user record for the identified individual, operation proceeds to step 908. In step 908 the biosecurity individual identifier number for the individual is determined based on the received identification information, e.g., the unique number assigned by the biosecurity server to identify the individual and the individual's user record. Then in step 910 the user's record is updated to include the entitlement information included in the received provisioning message so that the record will reflect the user's right to access an area or building or receive services to which the user is entitled as indicated in the provisioning message. Operation proceeds from step 910 to step 912 in which a provisioning response message is sent to the system which sent the provisioning message received in step 904 to indicate that provisioning at the biometric server has been completed and that the user is already registered with the server. Operation proceeds from step 912 to stop step 920.

Figure 10:
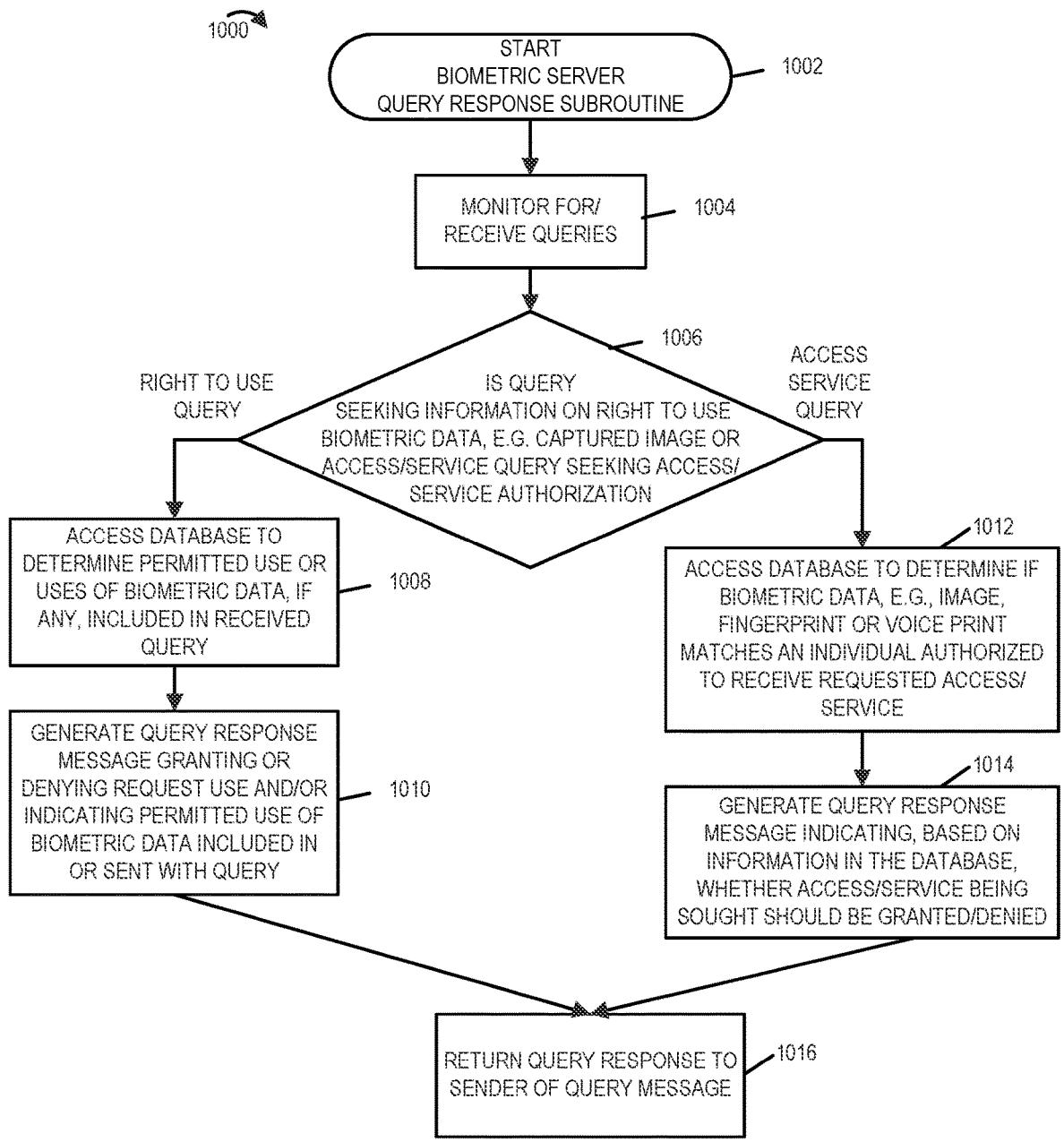
FIG. 10 illustrates the steps of a biometric server security response routine that can be implemented by any of the biometric servers shown in the present application.

FIG. 10 illustrates the steps of a biometric server security response routine 1000 that can be implemented by any of the biometric servers 102/300 shown in the present application.

The routine 100 starts in step 1002 and proceeds to step 1004 in which the biometric server monitors for and receives queries, e.g., queries including captured biometric information corresponding to an individual user seeking access to an area or building and/or seeking access to a service. The query, as discussed before, includes biometric information, e.g., an image of the person seeking access and information indicating the system sending the query to the biometric server. In response to receiving a query, operation proceeds from step 1004 to step 1006. It should be appreciated that monitoring step 1004 is performed on an ongoing basis with processing proceeding to step 1006 for each received query.

In step 1006 a determination is made if the query was seeking information on the right to use biometric data, e.g., an image, for various purposes such as marking or posting on websites or if it related so a system seeking to identify an individual to determine a right to access an area or service. If the query was a query relating to the right to use/distribute an image operation proceeds to step 1008. In step 1008 database information is accessed to determine permitted use or uses of the biometric data, e.g., if a user shown in the image authorized distribution or use for a purpose indicated in the query message. Then in step 1010 a query response message is generated indicating that the requesting party is authorized or not authorized to use the biometric data included in the query for the use indicated in the query message.

If in step 1006 it was determined that the received query related to an access or service authorization request or attempt, operation proceeds to step 1012. In step 1012 user records are accessed and biometric information, e.g., stored features and/or templates are used to try to identify a user to which the biometric information corresponds, If the user is identified a query response is generated based on the information included in the matching user record, e.g., the user ID of the identified individual is returned in a query response message and/or the requested access or service is granted or denied. The retuned user identifier will be the identifier suitable for the system which sent the query. For example, if the query was an employer and an employee of the employer was identified, the employee identifier such as employee number used by the company system which sent the query will be returned in the query response message. With the query response message having been generated in step 1010 or 1014 it is retuned om step 1016 to the entity, e.g., system, from which the query which is being responded to was received.

Figure 11:
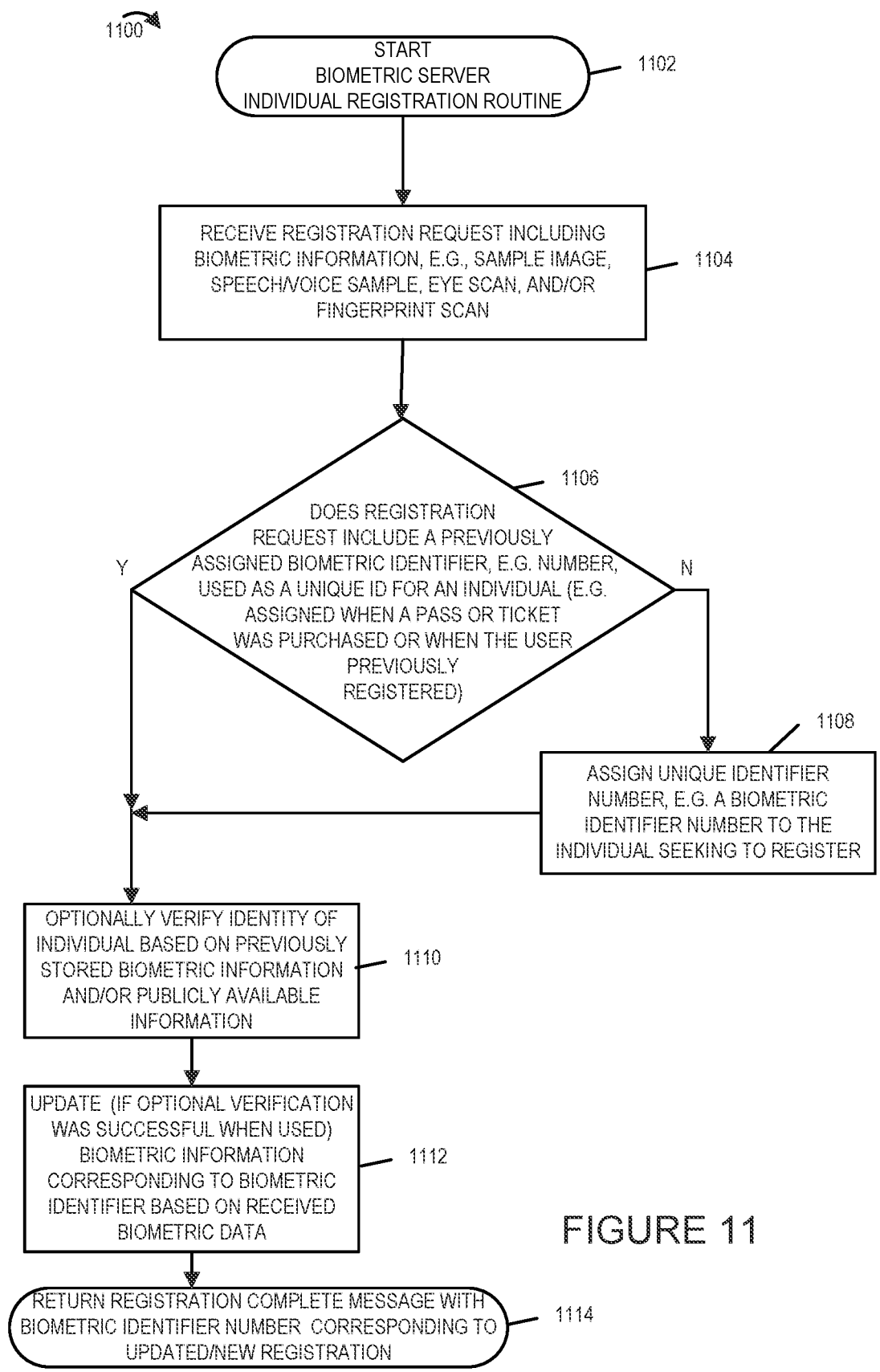
FIG. 11 shows the steps of a biosecurity server individual person registration routine which allows an individual user to provide personal biometric information which can be used to identify the individual.

FIG. 11 shows the steps of a biosecurity server individual person registration routine 1100 which allows an individual user to provide personal biometric information which can be used to identify the individual. The routine 1100 is implemented by a biometric server 102/300 and begins in start step 1102. Operation proceeds from start step 1102 to receive step 1104 in which the biometric server 102/300 receives a registration request from a user, e.g., from a user device 110 or 120, which includes a biometric sample, e.g., a sample image, speech sample, eye scan, fingerprint scan and/or handwriting sample. Operation proceeds from step 1104 to step 1106 in which a determination is made if the received registration request includes a previously assigned biometric identifier number or other individual identifier such as a pass or ticket ID that was previously registered, e.g., stored in a customer record. If the answer in step 1106 is no, operation proceeds to step 1108 and a unique identifier number is assigned to the user seeking to register biometric information. If in step 1106 the answer was yes, that is a previously assigned identifier exists, operation proceeds directly from 1106 to step 1110.

In step 1110 which is optional, the identity of the individual seeking to register is verified based on previously stored biometric information and/or publicly available information. Step 1110 is skipped in some embodiments. Operation proceeds from step 1110 to step 1112. In step 1112 biometric information in the user record corresponding to the user from which the registration request was received is updated. If step 1110 was performed and the verification failed step 1112 will be skipped since the user could not be verified and the registration will not be updated. Operation proceeds from step 1112 to step 1114 in which a registration complete message is returned to the user assuming the registration was successfully updated in step 1112. The registration complete message includes in some cases the unique biometric identifier used by the biometric server to identify the individual whose registration was updated.

Figure 12:
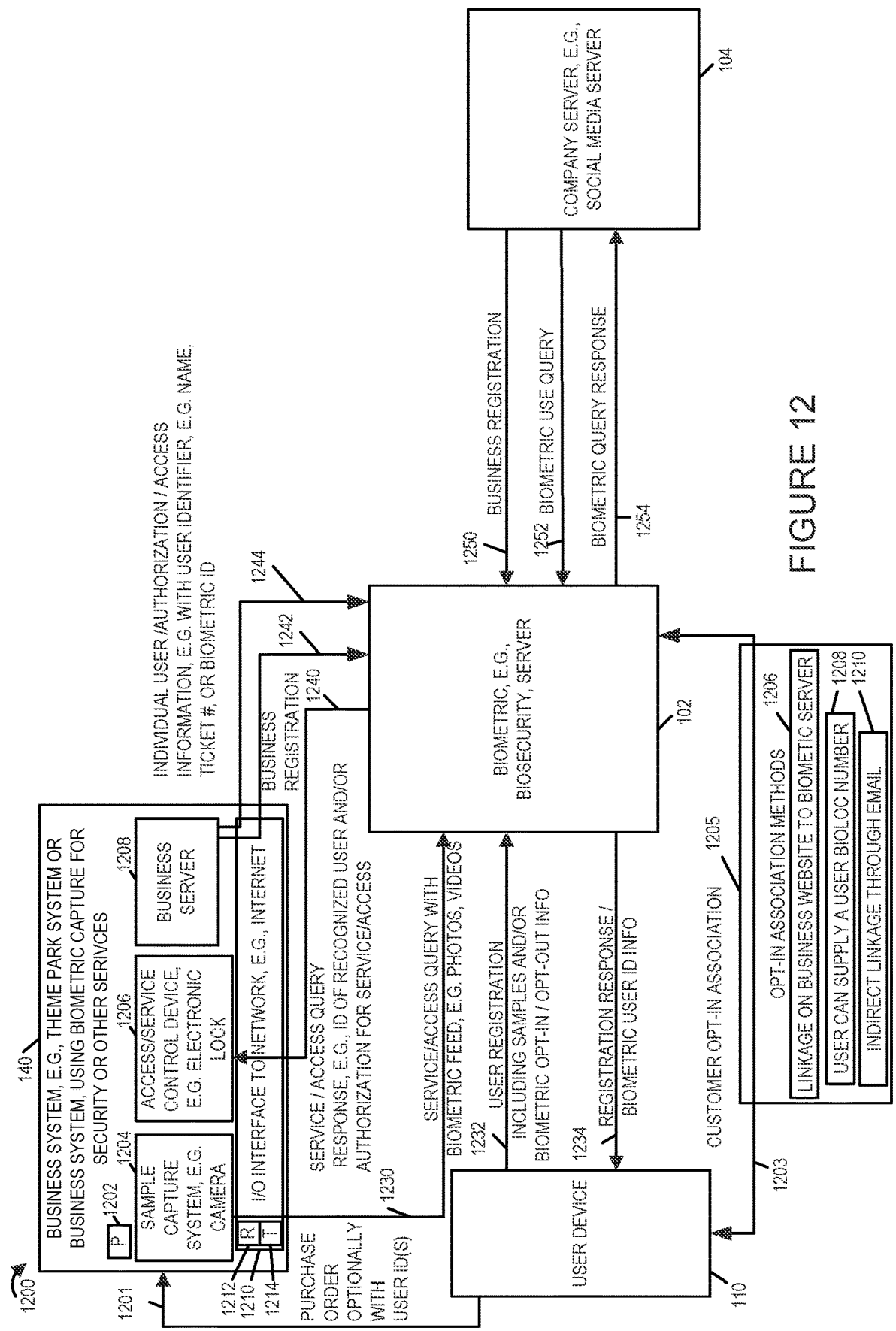
FIG. 12 is a high level diagram of a system including a business systems such as a theme park server, a biometric server, user devices and other components which can work together in accordance with the invention.

FIG. 12 is a high level diagram of a system 1200 including a business system 140, e.g., the theme park server 140, the biometric server 102, a company server 104 such as a social media server used to post and provide images and other social content, and a user device 110. The exemplary business system 140 includes a processor 1202, sample capture system 1204, access/service control device 1206 and a business server 1208. The access/control device maybe and sometimes is a lock or automated gate which is controlled by the processor 1202 and/or business server 1208 based on responses to queries to the biometric server and/or decisions made by the business server 1208 based on a user identified in a query response received form the biometric server 102. The business server includes memory storing user ticket/passes and/or access information which is used when an individual is identified in a query response to determine if the user should be provided requested access or a requested service. Arrows in FIG. 12 represent various signals that maybe and sometimes are sent in the system shown in FIG. 12. The business system 140 includes an input/output interface which includes a receiver 1212 and transmitter 1214. The I/O interface connects the business system 140 to the other devices in the system via the Internet or another connection allowing the business system and other devices to communicate with each other.

The arrows in FIG. 12 represent signals which can be sent between devices via the Internet or another network connection. Arrow 1201 represents a purchase order, e.g., a ticket or pass purchase order sent to theme park system 140. The purchase order optionally includes a user identifier or biometric service user identifier that can identify a user for which the ticket or pass is being purchased. Arrow 1242 represents a business registration which can be used to register the business and business system 140 with the biometric server 102 so that the business system can send queries to the biometric server 102 and receive identification or access/service information in response. Arrow 1244 represents the business system sending individual user/authorization/access information informing the biometric server of one or more individuals who are to register with the biometric server and/or have already registered and are entitled to receive services or access to locations corresponding to business system 140 so that the server 102 can provide identification services to facilitate access/service decisions to individuals who attempt to receive a service or access an area. Message 1244 maybe and sometime is sent in response to a ticket or pass purchase.

Arrow 1230 represents a service/access query sent when an individual is seeking a service or access from the business system and includes a biometric sample captured by the sample capture system 1204 of the business system 140. Arrow 1240 represent a service or access query response sent in response to query 1230. The respond identifies an individual based on the biometric information included in the query and stored biometric information and/or stored recognition templates. The response 1240 identifies and individual seeking access or a service or indicates the action to be taken in response to the access or service request, e.g., automatically allow admission to the park or ride or deny access.

Arrow 1232 represents a user registration message to the biometric server from a user device used to provide a biometric sample and register with the biometric server so that the server can identify the user for access/service inquiry response purposes. Thus, a person can register an image of him or herself using message 1232 to obtain access to the theme park 140.

Arrow 1234 represents a registration response used to provide a biometric user identifier number assigned to the user of user device 110 and/or to indicate successful registration or updating of user biometric information stored at the server 102.

Bi-directional arrow 1203 is used to represent various signaling related to opting into one or more services provided by biometric server 102. Opt in options/methods are illustrated in box 1205. A user of user device 110 can opt in via a link to the biometric server 102 included on a business website, e.g., on a web page offering park tickets/passes for sale. Alternatively, the user can opt into a service by providing a biometric server user identifier number and providing information indicating the services being authorized as indicate by box 1208 or a user can receive a link in an Email, e.g., when a park or other ticket or pass is purchased, and use the link to establish communication with the server 102. The registration message 1232 and response 1234 may be part of the opt in communication represented by arrow 1203.

Arrows 1250, 1252 and 1254 represent messages between social media server 104 and biometric server 102. Registration message 1250 represents registration of the social media server 104 with the biometric server so that it can receive services from the server 102. Biometric use query 1252 is a query relating to the right to post a captured image or use the image for marketing purposes while biometric query response 1254 indicates whether or not the image can be used for a purpose indicated in the biometric query message 1252.

Figure 13:
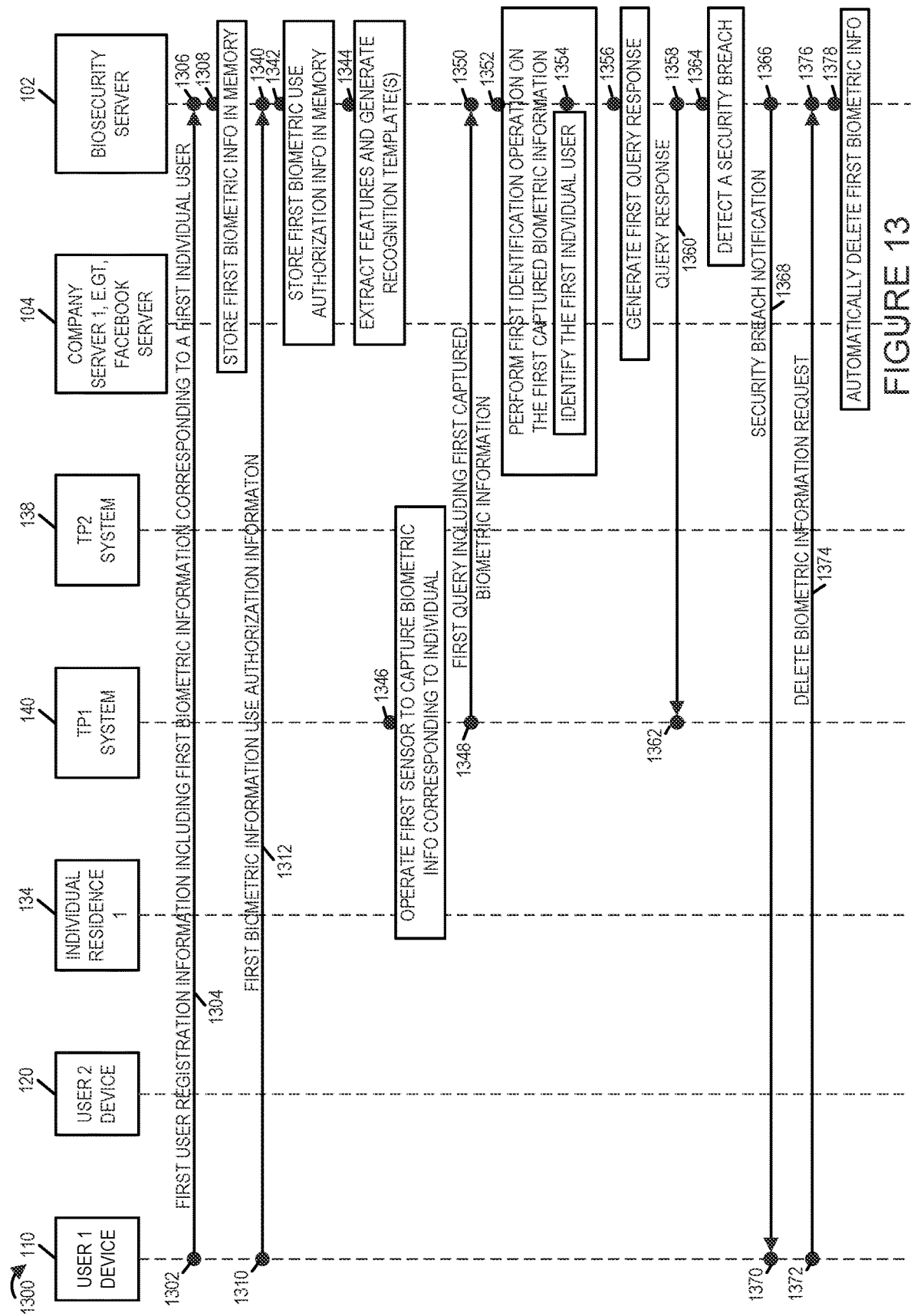
FIG. 13 shows various signaling between system components and steps which may occur in accordance with some embodiments of the invention.

FIG. 13 is a diagram 1300 showing various signaling between system components and steps which may occur in accordance with some embodiments of the invention. The components are numbered as in the other figures for consistency and will not be described in detail again.

In the sequence shown in FIG. 13, a user registers with eh biosecurity server 1-2. In step 1302 a registration information is sent with biometric information corresponding to a first user of the first device to the biometric server 102. The biometric server receives the registration message in step 1306 and then stores it in memory, e.g., in a customer record corresponding to the first user in step 1308. In step 1310 the user sends first biometric information use authorization information indicating what companies, services or uses the supplied biometric information can be used for. The information may also include information on whether or not images of the user can be posted on social media websites. In step 1342 the biometric use information received form the first user is stored in a customer record corresponding to the first user that is stored in a memory device of the biometric server 102.

In step 1344 the biometric server 102 extracts features and generates recognition templates corresponding to the first user based on the received biometric information. The features and/or templates are then stored in the user record corresponding to the first user for future use in recognition operations.

In step 1346 a theme park sensor captures biometric information of the first user when the first user tries to access the park or use a park pass which the first user purchased. The them park system 140 sends a first query to the biosecurity server 102 including an image of the first user that was captured by the theme park sensor, e.g, camera. In step 1352 the biometric server 102 performs a recognition operation on the biometric sample, e.g., image included in the first query to identify a user based on stored recognition templates. In step 1354 the biometric server 102 identifies the first user based on the stored recognition template corresponding to the first user. Then in step 1356 the biometric server 102 generates a first query response. The first query response includes a ticket number, pass number, user name or other identifier indicating to the theme park system that first user was identified. In some cases, the query response indicates that the first user is authorized to access the park or service. The response is received in step 1362 and based on the information included in the response the theme park system 140 determines the action to be taken in response to the first user's access attempt, e.g., the user is admitted to the theme park assuming the park has information indicating the user has a valid ticket or pass or the biosecurity service indicated that the first user should be admitted. A lock or other automatic access control device will be opened by the system 140 in response to the determination that the first user is to be granted access. Thus, the theme park system 140 can be provided with biometric identification services without having to store biometric identification information or templates in the system 140.

In addition to facilitating access or service decisions the biosecurity server 102 can handle issues relating to the biometric information it stores.

In step 1364 a security breach is detected and in step 1366 an automatic security breach notification 1368 is sent to users, including the first user, whose information was accessed in the breach. Thus, users can be automatically notified of breaches which can be helpful in cases where breach notifications are required by regulations or other rules. In step 1370 the first user device receives the breach notification 1368.

In step 1372 the first user sends from the first user device a delete biometric information request 1374 which is received in step 1376. In step 1378 the biometric server 1378 automatically deletes the first user's stored biometric information in response to the received delete request 1374.

As should be appreciated the theme park systems 140, 136 and other systems including residence security system 134 need not be and are not involved in management of the biometric information stored, used and maintained by the biometric server 102. Accordingly, the operators of these other systems are not responsible for complying with biometric information storage regulations and can focus on their businesses without needing to keep up with such regulations while still being able to use biometric identification services provided by the biometric server 102.

Registration, management of biometric information, e.g., stored templates, identification and/or authorization functions are supported by the registration entity, biometric server 102. In various embodiments a user contacts the system to register with regard to the biometric management and authorization service. The user and/or entity such as, a legal guardian, authorized to act on behalf of someone being registered, e.g., a minor such as a child, is authenticated and then provides the system one or more samples of biometric information corresponding to one or more different modalities. The biometric information is stored and/or processed to generate recognition templates that can be used to identify the individual being registered. Alternatively, the user provides the system the authority to access and retrieve biometric information, e.g., raw input data such as images of the user, a user's fingerprints, and/or templates which can be used for biometric recognition operations from one or more other sources, e.g., Facebook, government records, such as driver's license or passport records, etc. The system receiving the biometric input and/or authorization to retrieve such input, stores the provided or retrieved biometric information and/or templates. Received or retrieved biometric information is processed to generate templates, e.g., of one or more features of the biometric information, which can be used to determine if there is a match between captured or supplied biometric information and the information/templates corresponding to an individual user who has registered with the system.

The biometric information and/or templates which can be used for matching the user to supplied input, e.g., an image, writing sample, fingerprint, are stored in a record corresponding to a user. The user and/or entity representing the user is provided the opportunity to set use and/or access privileges with regard to the different types of stored biometric information and/or corresponding templates. For example, in some embodiments, images and/or recognition templates corresponding to a user are stored, writing samples and/or writing templates that can be used to determine if a writing sample corresponds to the user to whom the record corresponds and/or other types of distinct biometric information such as fingerprints are stored. A user and/or the user's representative sets access restrictions and also restrictions on when biometric information of the given type can be used by another entity. For example, fingerprint information may be authorized by the user for access to laptops and/or other electronic devices owned or issued to the user, e.g., by the government or an employer, but not for general distribution or for other purposes. Facial images may be authorized for use for non-commercial purposes such as on Facebook and/or other websites but not for commercial purposes.

Handwriting/signature samples and/or templates can be authorized for use with regard to checking credit card, check and/or other financial transactions but not for other purposes. In addition to being able to set specific uses for specific types of information the user can also restrict such uses to particular entities. For example, the user may specify that signature and/or writing information is authorized for use by banks and/or credit card companies explicitly specified by the user, e.g., ones used by the user, but not other entities.

A user may also specify whether the underlying biometric sample and/or template can be provided to entities the user authorizes to use such information or the entities are restricted to providing sample and/or extracted feature sets for testing to determine if they match a user's stored identification information. In some embodiments a party seeking identification of a user and which provides a sample or set of extracted features to the registration and management service is required to specify not only the requesting party's identity but also the intended use of the identification confirmation requested and/or intended use of the supplied biometric data.

A user can specify a requested action to be taken in some embodiments when a party provides a sample which matches the biometric information corresponding to a user but the entity providing the sample or extracted features is not authorized to use the information or/or not authorized to receive an identity confirmation. For example, that information may indicate that the image of the user's face should be blurred or replaced with an image of another individual. With regard to a request for a confirmation of a fingerprint that is for an unauthorized purpose or use, the user may specify that the response should be "no match found" or "requested use not permitted" even where a match is found. The user may also request notification of attempted unauthorized use of his/her biometric information with the user being notified of the request and in some cases the requesting party. In this way the system can act like a credit alert service but with regard to attempted use of biometric data helping to put a user on the alert when his/her biometric information is being used. Similarly, even in cases where user of biometric information is authorized, a report of such use, the party using the information, and the indicated purpose of the use can be made. A user can subscribe to reports with regard to use of his/her biometric information and receive a report similar to a credit report but instead listing when, by whom and for what purpose other users and/or entities tried to use or check on a user based on one or more biometric samples or sets of biometric features.

Accordingly, the service of the present invention help a user to take control of use of his/her biometric information by serving as a bureau or other entity which can check biometric information against known information of users, control the use of such checks and/or biometric information, and/or generate reports and/or alerts which can be supplied to a user regarding checks made on the user or attempts to use the individual's biometric information and/or templates for one or more purposes.

An exemplary method of operating a privacy control node, comprises: receiving a query including captured biometric information which can be used to identify one or more individuals; identifying an individual based on the received biometric information; and determining from stored information whether the identified individual has authorized use of information corresponding to the identified individual or an image of the identified individual. In some embodiments the biometric information includes weight or a fingerprint scan of the user. In some embodiments the information corresponding to the identified user includes at least one of user preference information, user purchase history, web browsing information. In some embodiments the stored information includes authorized uses of information corresponding to the identified individual, authorized uses of images of the identified individual, authorized services or authorized web sites for which the individual has indicated his/her image may be used.

In some embodiments the method further comprises responding to the query with a message indicating that use of images of the identified individual is not authorized. In some embodiments the captured biometric information is an image and the response to the query includes a modified version of said image. In some embodiments the modified version of the image includes an alteration to a portion of the image which corresponds to the identified individual. In some embodiments the alteration of the portion of the image includes blurring or blocking out of some of the portion of the image which corresponds to the identified individual. In some embodiments the alteration of the portion of the image includes modifying or replacing at least a portion of the face of the identified individual in the image to render the individual unrecognizable in the modified version of said image.

In some embodiments the query includes information indicating the intended use of the image. In some embodiments the method further comprises providing the identified individual with a report regarding received queries including images in which the identified individual was identified. In some embodiments the query includes information indicating that the intended use of the image is for one of: commercial use or advertising/marketing use. In some embodiments the query includes information indicating that the intended use of the image is for one: non-profit fundraising campaign, a humanitarian project, a social work related project, or non-commercial activity.

An exemplary privacy control node, e.g., registration and biometric information management node, implemented in accordance with some embodiments comprises: a receiver configured to receive a query including captured biometric information (and/or corresponding template) which can be used to identify one or more individuals, and a processor configured to i) identify an individual based on the received biometric information, and ii) determine, based on stored information, whether the identified individual has authorized use of information corresponding to the identified individual or an image of the identified individual. In some embodiments the privacy control node further comprises: memory including the stored information, the stored information identifying authorized uses of information corresponding to the identified individual, authorized uses of images of the identified individual, authorized services or authorized web sites for which the individual has indicated his/her image may be used.

In some embodiments the processor is further configured to generate a response message, in response to the query, indicating that use of images of the identified individual is not authorized, the response message indicating that use of images of the identified individual is not authorized being generated when the determination module determines that the identified individual has not authorized use of his or her image. In some embodiments the privacy control node further comprise a transmitter configured to transmit the response message to a device in response to the query. In some embodiments the processor is configured to control the transmitter to transmit the response message to a device in response to the query. In some embodiments the captured biometric information is an image and the processor is further configured to generate a modified version of the image, and include the modified version of the image in the response message. In some embodiments the modified version of the image includes an alteration to a portion of the image which corresponds to the identified individual. In some embodiments the processor is further configured to perform the alteration of the portion of the image by blurring or blocking out of some of the portion of the image which corresponds to the identified individual. In some embodiments the processor is configured to perform the alteration of the portion of the image by modifying or replacing at least a portion of the face of the identified individual in the image to render the individual unrecognizable in the modified version of the image.

In some embodiments the processor is further configured to generate a report regarding received queries including images in which the identified individual was identified and control the transmitter to send the report to the identified individual.

Methods and apparatus are described which allow different companies, individuals and/or government entities to use biometric security and/or access systems or services without having to store biometric information for individuals on an ongoing basis and/or to perform a comparison between recently captured biometric information corresponding to an individual seeking access to a location or a service.

A biometric server is used to control access to stored biometric information where the server and/or database storing the biometric server are located remotely, e.g., at a central location, physically remote from the sites where access to locations and/or services are provided.

The storage and use of the biometric information can be and often is implemented and controlled by a separate company from the company using the server to determine whether access or a service should be provided to an individual. The storage and use of the biometric information is implemented in accordance with government requirements and/or laws with the individual companies using the server not having to ensure compliance with such requirements/laws since that is done by the biometric server operator who controls the storage and use of the stored biometric information.

By centralizing the storage and access/service decisions based on biometric data, the same stored data can be used to provide biometric access/service grant or denial decisions to a wide range of companies, individuals and/or government entities without the entities having to manage the storage of biometric data used for verification purposes. This can remove much of the burden of creating, maintaining and securing the biometric data used for verification purposes from the entities seeking to implement biometric security for particular applications and can allow multiple companies to rely on the same set of biometric data while also allowing individuals whose biometric information is stored the right to control the use of their biometric information and restrict which companies/entities can use the stored biometric data. Accordingly, the methods and apparatus of the present invention facilitate not only user control over their biometric information and samples but also make it easy for companies to incorporate biometric verification and access controls without having to collect, store or independently verify biometric information and also potentially allow individual companies to avoid possible liability for potentially improper storage or release of biometric data by allowing companies to use such data but not have direct access to or control over the data.

In various embodiment a company seeking to use biometric security installs an automatic door or gate blocking access to a location or service. A camera or other sensor, e.g., mic, is used to capture a biometric sample, e.g., image or speech sample of an individual who seeks access to the location or service protected using the automatic door or gate. The captured sample is communicated, e.g., in a service or access query message, in many cases after being encrypted, to a biosecurity server located at a site which is physically remote, e.g., miles away, from the location where access or service is being sought. The biometric server compares the received sample, e.g., after description if encrypted, to biometric information, e.g., samples. stored in its database. If the received biometric information matches that of an individual who is authorized to access the location or receive service being sought, e.g., which maybe and often is indicated in the received query message, a response message is sent to the device which sent the query message indicating that the requested access or service is authorized and that the request should be granted. If the biometric information that is received in the query message does not match an individual authorized to receive the service or access being sought, the query response message that is sent indicates that the requested access or service should be denied. The gate, door or other access/service control device at the site where the biometric sample included in the query was captured is controlled based on the received query response with the door or gate being automatically opened or the requested access/service being granted if the response message indicates that it should be granted, or the access service is automatically denied when the query response indicates it should be denied.

Thus the methods and apparatus of the present invention allow for biometric security to be implemented with relatively little hardware at an end user's site, e.g., biometric security service user's with the equipment at the end site including in some embodiments an automated access control device (e.g., powered door or gate lock), biometric capture device (e.g., camera or mic), control processor which is coupled to the other components and which is configured to and does control i) biometric sample capture, ii) the automated access control device and ii) the communications device to communicate and operate in accordance with one or more of the described methods.

Methods and apparatus are described which allow a different companies, individuals and/or government entities to use biometric security and/or access systems or services without having to store biometric information for individuals on a ongoing basis and/or to perform a comparison between recently captured biometric information corresponding to an individual seeking access to a location or a service.

A biometric server is used to control access to stored biometric information where the server and/or database storing the biometric server are located remotely, e.g., at a central location, physically remote from the sites where access to locations and/or services are provided.

The storage and use of the biometric information can be and often is implemented and controlled by a separate company from the company using the server to determine whether access or a service should be provided to an individual. The storage and use of the biometric information is implemented in accordance with government requirements and/or laws with the individual companies using the server not having to ensure compliance with such requirements/laws since that is done by the biometric server operator who controls the storage and use of the stored biometric information.

By centralizing the storage and access/service decisions based on biometric data, the same stored data can be used to provide biometric access/service grant or denial decisions to a wide range of companies, individuals and/or government entities without the entities having to manage the storage of biometric data used for verification purposes. This can remove much of the burden of creating, maintaining and securing the biometric data used for verification purposes from the entities seeking to implement biometric security for particular applications and can allow multiple companies to rely on the same set of biometric data while also allowing individuals whose biometric information is stored the right to control the use of their biometric information and restrict which companies/entities can use the stored biometric data. Accordingly, the methods and apparatus of the present invention facilitate not only user control over their biometric information and samples but also make it easy for companies to incorporate biometric verification and access controls without having to collect, store or independently verify biometric information and also potentially allow individual companies to avoid possible liability for potentially improper storage or release of biometric data by allowing companies to use such data but not have direct access to or control over the data.

In various embodiment a company seeking to use biometric security installs an automatic door or gate blocking access to a location or service. A camera or other sensor, e.g., mic, is used to capture a biometric sample, e.g., image or speech sample of an individual who seeks access to the location or service protected using the automatic door or gate. The captured sample is communicated, e.g., in a service or access query message, in many cases after being encrypted, to a biosecurity server located at a site which is physically remote, e.g., miles away, from the location where access or service is being sought. The biometric server compares the received sample, e.g., after description if encrypted, to biometric information, e.g., samples. stored in its database. If the received biometric information matches that of an individual who is authorized to access the location or receive service being sought, e.g., which maybe and often is indicated in the received query message, a response message is sent to the device which sent the query message indicating that the requested access or service is authorized and that the request should be granted. If the biometric information that is received in the query message does not match an individual authorized to receive the service or access being sought, the query response message that is sent indicates that the requested access or service should be denied. The gate, door or other access/service control device at the site where the biometric sample included in the query was captured is controlled based on the received query response with the door or gate being automatically opened or the requested access/service being granted if the response message indicates that it should be granted, or the access service is automatically denied when the query response indicates it should be denied.

Thus the methods and apparatus of the present invention allow for biometric security to be implemented with relatively little hardware at an end user's site, e.g., biometric security service user's with the equipment at the end site including in some embodiments an automated access control device (e.g., powered door or gate lock), biometric capture device (e.g., camera or mic), control processor which is coupled to the other components and which is configured to and does control i) biometric sample capture, ii) the automated access control device and ii) the communications device to communicate and operate in accordance with one or more of the described methods.

Currently, individual companies or even municipalities are attempting to establish privacy controls in a disjointed fashion in response to a general desire for public/consumer privacy. In some cases, this takes the form of an opt-out checkbox for a particular app; in other cases, it may even be local laws placing a moratorium on biometric data collection—such as a pair of ordinances to that end that recently passed a vote in Portland, Oregon. Federal agencies, including DHS, have also been grappling with how to use biometrics without stirring up privacy concerns. There is a definite need for an organized approach, with a "do not track" registry for biometrics serving as a baseline for opt-out functionality. However, there is demand for a more comprehensive set of services and for both organizations and consumers alike.

In various embodiments a central service is provided that enables individuals to unambiguously opt-out of biometric data use; simultaneously, this service could also allow consumers to explicitly opt-in to specific organizations using their data for select purposes.

In some but not all embodiments by default, a typical registered user will "opt out" of allowing broad use of their biometric data, until they make the conscious choice to "opt in." If an organization were to query the biometric server (providing a photograph, video, or perhaps signature sample of that user) then the returned status message would in some embodiments reflect the user's stated preference. The organization would not need to retain any additional artifacts that identify the user or maintain a database of biometric information in order to make this query (or future queries).

Conversely, consider a modern grocery store that wishes to add a biometric-driven checkout process. A shopper can and sometimes will opt-in, e.g., as part of a registration process, to allow their facial data to be recognized and used to provide automated payment confirmation at that store, but still opt-out of using their biometrics for advertising. In the case of a retail clothing store, the shopper may want to opt-in to advertisements based on their biometric profile for a better tailored shopping experience.

To increase transparency in biometric collection and authorization, query and other events are recorded, e.g., stored in a database maintained by the biometric server and in some cases made available to the interested parties. Users can have a timeline-based overview of changes to their account (opt-in, opt-out, etc.) as well as queries made by organizations (what businesses wanted to check their signature, or uploaded video of the user). This view can and sometimes is used to jump to settings pages, to update permissions appropriately. Organizations would be able to see statistics as well, such as the number of processed images, how many clients were recognized through biometric processes, how many users in total have allowed use of their biometric information, etc.

Individuals can reach and provide information to the biometric server in a number of ways, e.g., when looking to register and/or adjust opt-in and opt-out preferences. First, directly by visiting the platform via a web page or other Internet access operation. Second, being invited to sign up and make use of the service(s) provided by the biometric server by an organization. Third, by being given the option to authenticate a process with a biometric identifier (ID) such as a unique number assigned to an individual and associated with the individual. This allows users to proactively select their privacy settings (or make use of additional services), select from preconfigured settings suggested by an organization via invitation (to support a specific service), or utilize the biometric server in support of some transaction (perhaps to associate biometric information with concert tickets at checkout).

ID associations may be made to allow a business to associate a specific account or record with their own organization-specific settings as permitted by the user; for example, a theme park may store credit card payment information under one alias, and cross-reference it with a biometric account ID in support of a transaction. If a user does not allow their individual biometric ID to be shared, it will not be shared in some embodiments. Alternative approaches involve storing app or org-specific IDs may be supported.

Settings pages for setting user preferences are supported by the biometric server in some embodiment and allow users to alter preferences in masse, or for specific organizations. The type of biometric data, collection methods, personally identifiable information, and acceptable services are configurable options. Search mechanisms allow a user to find organizations that make use of the biometric server functionality, and read a brief organization overview (including name, location, logo, and brief description).

The biometric server, in some embodiments retains, e.g., in a secure database, user data (individual data) in order to support various services and functions provided by the biometric server. The stored user data may and in some embodiments does include PII and biometric data and models. This can include samples such as images or voice (speech) samples corresponding to the individual user. However, in many embodiments for security users this data is not carelessly shared with organizations or other users in order to function and in fact companies and other service users are not allowed access to the stored biometric information in many cases and in at least some cases the biometric information is stored in encrypted from and only decrypted for use.

In various embodiments organizations, e.g., companies query information, e.g., request information as to whether an access or service request should be granted or denied, through a programmatic web API or other communications interface which may and sometimes does have Internet connectivity. as described earlier. The server returns only the relevant information, as allowed by the user, e.g., a grant or denial of an access request. If a user does not make their name available to the organization, it will not be furnished to the organization upon receipt of a photograph; likewise, contact information such as an email address or phone number used to sign up for the biometric server by an individual will not be provided in some embodiments unless the individual user preferences, as stored in the individual's information included in the database, authorize it.

Individuals are able to change their personally identifiable and contact information as needed. Additionally, individuals can outright terminate their account if desired. In some such embodiments, identifiable user data is destroyed, including personal information, biometric models, and user preferences. The record that an organization may have run a specific query against a user ID would may and sometimes will remain in the system. However, the user ID corresponding to the individual deleting his/her record may no longer be associated in the biometric server with a particular identifiable individual.

While most "users" or "clients" are independent persons, i.e., human individuals, the biometric server concept can be and sometimes is extended to families or groups. In this way, users can be managed and self-organize appropriately, to adjust settings for each other. For example, a parent might opt-in for a child, or a business manager might opt-out their team members or even a home owner may seek to register their pet as an individual with access rights to the family home so that the pet can be recognized and automatically allowed admittance to the family home just as a human member of the family would.

Supported biometric information that maybe and sometimes is included in the record corresponding to an individual includes facial data, gait data, handwriting/signature, voice, and more. Supported collection types can include audio, video, still images, etc. Personally identifiable information can include data unique to the user as a person, contact information, or information related to specific user property (such as license plate information or serial numbers).

Beyond core features such as the opt-in and opt-out mechanisms and generally "settings" for biometric use data, additional functionality can be added for the benefit of users and organizations alike. Statistical analysis on data use, e.g., access grants/denials, can be and sometimes are synthesized and provided to biometric server users, alongside trend analysis. Privacy-focused tools, such as tools to provide additional security check-ups for social media and monitoring of misuse of personal information/photographs/etc, guidance on image and PII posting, and applications similar to those in the AI-based counter-biometrics patent etc. can be and sometimes are presented to biometric service subscribers.

The biometric server can be used to facilitate the sale or negotiation of biometric data use; in other words, organizations can incentivize users to provide their biometric data willingly through some value exchange e.g., discounts or direct payment. Biometric server registration can be used to affirm interest in the responsible use of biometric and PII material, much in the way businesses display industry group membership information.

The biometric server can be used as a "credit bureau for responsible biometric use,". In such embodiments an independent rating that is earned and maintained can be of value to the company and consumer alike in establishing trust relationships. The ability for consumers to rate, or complain about, businesses can be a draw for users in such an embodiment (this is a common reason for users to register on business ratings applications, beyond mere discovery) and complaints can help a business understand how they are perceived by the public.

Appropriately respecting user settings could help government organizations avoid the impression of civil rights violations from broad biometric collections, additionally.

First Numbered List of Exemplary Method Embodiments

Method Embodiment 1. A method of providing a biometric service, the method comprising: receiving (1306) at a biometric server first user registration information including first biometric information corresponding to a first individual user; storing (1308) the first biometric information in memory; receiving (1350) a first query including first captured biometric information (e.g., an image or biometric measurement) from a first remote system (e.g., first park server or computer system where images are captured and forwarded as part of a query to the biometric server); performing (1352) at the biometric server a first identification operation on the first captured biometric information, said identification operation being based on at least the first biometric information or features extracted from the first biometric information; and returning (1358) to the first remote system a first query response.

Method Embodiment 2. The method of Method Embodiment 1, further comprising: storing (1340) in said biometric server first biometric information use authorization information provided by the first individual user, said first biometric information use authorization information indicating businesses for which the first biometric information can be used (e.g., for identification and/or authorization of services).

Method Embodiment 2A. The method of Method Embodiment 2, wherein said first biometric information use authorization information includes information identifying at least two different businesses for which the first biometric information is allowed to be used for identification purposes, but which are not entitled to access or receive copies of the first biometric information.

Method Embodiment 2B. The method of Method Embodiment 2A, wherein performing (1352) at the biometric server, a first identification operation includes identifying (1354) the first individual user from the first captured biometric information based on the first biometric information or features extracted from the first biometric information; and wherein the method further comprises: generating (1356) the first query response by generating a response message including a first individual user identifier corresponding to the first individual user.

Method Embodiment 2C. The method of Method Embodiment 2, wherein the identifier corresponding to the first individual user is a number or alphanumeric sequence corresponding to the first individual user.

Method Embodiment 2D. The method of Method Embodiment 2C, wherein said number or alphanumeric sequence is a pseudo randomly generated number or alphanumeric sequence used as an identifier of the first individual user.

Method Embodiment 2E. The method of Method Embodiment 2C, wherein said biometric server does not store the actual name of the first individual user and does not include the actual name of the first individual user in first query response.

Method Embodiment 2F. The method of Method Embodiment 2C, wherein the identifier corresponding to the first individual user is a number or alphanumeric sequence (e.g., employee number, ticket number or park pass number) supplied by the first remote system or an operator of the first remote system.

Method Embodiment 2G. The method of Method Embodiment 2F, wherein the first individual user identifier corresponding to the first individual user is different from another first individual user identifier corresponding to the first individual user used to identify the first individual user to a second remote system (e.g., different employee identifiers are used for the first individual user when the individual works for multiple different companies, e.g., a first number is used as a first employee identifier for the first user with respect to a first company and a second number, different from the first number, is used as an employee identifier for the first user with respect to a second company for which the first user works but the same biometric identification information is used by the biometric server to identify the employee regardless of whether the first or second company submits an identification query.

Method Embodiment 2H. The method of Method Embodiment 1, wherein the first individual user identifier is the actual name of the identified individual.

Method Embodiment 3. The method of Method Embodiment 1, further comprising: receiving (1376), at the biometric server, a delete biometric information request from the first individual user; and automatically deleting (1378), at the biometric server, the first biometric information in response to the biometric information request.

Method Embodiment 4. The method of Method Embodiment 3, further comprising: detecting (1364) (e.g., automatically) a security breach at the biometric server; and informing (1366) (e.g., automatically) the first user of the detected security breach.

Method Embodiment 5. The method of Method Embodiment 1, wherein the first remote system includes a first sensor (e.g., camera, eye imager, hand scanner, mic for capturing a voice sample, and/or handwriting capture device) for capturing said first captured biometric information, the method further comprising: operating (1346) the first sensor to capture biometric information (e.g., image, voice and/or handwriting sample) corresponding an individual seeking entry to an area or seeking obtain a service and communicating (1348) (e.g., via a network connection) the captured biometric information to the biometric server as part of the first query.

Method Embodiment 6. The method of claim 5, wherein the first query includes information identifying the first remote system (and thus the business corresponding to the system) from which the query is sent.

Method Embodiment 7. The method of Method Embodiment 6, wherein the first remote system is one of a plurality of amusement park systems to which the biometric server provides identification services.

Method Embodiment 8. The method of Method Embodiment 6, wherein the first remote system is a home security alarm system located in a home of the first individual user.

Method Embodiment 9. The method of Method Embodiment 6, wherein the first remote system is an employer business system used by an employer of the first individual user to control access to a business site.

Method Embodiment 10. The method of Method Embodiment 9, wherein a record stored in the biometric server indicates that the first individual user has authorized the use of the first biometric information to be used for identification services provided for the first individual user's home security system, a first employer system of a first employer who employs the first individual user and at least one amusement park system.

Method Embodiment 11. The method of Method Embodiment 10, wherein the biometric server stores multiple different types of biometric information corresponding to the first user including a voice sample, a handwriting sample, a face image, and/or hand shape information and/or feature information generated from the stored biometric sample information corresponding to the first user.

Method Embodiment 12. A method of operating a server having access to stored biometric information, the method, comprising: receiving a query including captured biometric information corresponding to an individual seeking access to a location or seeking a service and indicator of the location to which access is sought or the service to which access is sought; determining if the captured biometric information matches stored biometric information corresponding to an individual authorized to receive access to the location or access to the service indicated in the received query; and sending a response to said query, said response indicating whether the requested access or service should be granted or denied.

Method Embodiment 13. The method of Method Embodiment 12, wherein the response to said query indicates that the requested access or service should be granted when the biometric information received in the query matches stored biometric information corresponding to an individual authorized to access said location or receive said service; and wherein the response to said query indicates that the requested access or service should be denied when the biometric information received in the query is determined not to match (e.g.., does not match) stored biometric information corresponding to an individual authorized to access said location or receive said service.

Numbered List of Exemplary System Embodiments

System Embodiment 1. A system (100) comprising: a biometric server (102 or 300) including: a first receiver (342); a first transmitter (340); memory (312); and a first processor (308) configured to: operate the biometric server to receive (1306) (via the first receiver) first user registration information including first biometric information corresponding to a first individual user; store (1308) the first biometric information in said memory (312); operate the biometric server to receive (1350) (via the first receiver (342)) a first query including first captured biometric information (e.g., an image or biometric measurement) from a first remote system (140) (e.g., first park server or computer system where images are captured and forwarded as part of a query to the biometric server); perform (1352) at the biometric server a first identification operation on the first captured biometric information, said identification operation being based on at least the first biometric information or features extracted from the first biometric information; and operate the biometric server to return (1358) (via the first transmitter (340)) to the first remote system (140) a first query response.

System Embodiment 2. The system (100) of System Embodiment 1, wherein said first processor (308) is further configured to: store (1340) in said biometric server first biometric information use authorization information provided by the first individual user, said first biometric information use authorization information indicating businesses for which the first biometric information can be used (e.g., for identification and/or authorization of services).

System Embodiment 2A. The system (100) of System Embodiment 2, wherein said first biometric information use authorization information includes information identifying at least two different businesses for which the first biometric information is allowed to be used for identification purposes, but which are not entitled to access or receive copies of the first biometric information.

System Embodiment 2B. The system (100) of System Embodiment 2A, wherein said first processor (308) is further configured to: identify (1354) the first individual user from the first captured biometric information based on the first biometric information or features extracted from the first biometric information, as part of being configured to perform (1352) at the biometric server, a first identification operation; and generate (1356) the first query response by generating a response message including a first individual user identifier corresponding to the first individual user.

System Embodiment 2C. The system (100) of System Embodiment 2, wherein the identifier corresponding to the first individual user is a number or alphanumeric sequence corresponding to the first individual user.

System Embodiment 2D. The system (100) of System Embodiment 2C, wherein said number or alphanumeric sequence is a pseudo randomly generated number or alphanumeric sequence used as an identifier of the first individual user.

System Embodiment 2 E. The system (100) of System Embodiment 2C, wherein said biometric server does not store the actual name of the first individual user and does not include the actual name of the first individual user in first query response.

System Embodiment 2F. The system (100) of System Embodiment 2C, wherein the identifier corresponding to the first individual user is a number or alphanumeric sequence (e.g., employee number, ticket number or park pass number) supplied by the first remote system or an operator of the first remote system.

System Embodiment 2 G. The system (100) of System Embodiment 2F, wherein the first individual user identifier corresponding to the first individual user is different from another first individual user identifier corresponding to the first individual user used to identify the first individual user to a second remote system (138) (e.g., different employee identifiers are used for the first individual user when the individual works for multiple different companies, e.g., a first number is used as a first employee identifier for the first user with respect to a first company and a second number, different from the first number, is used as an employee identifier for the first user with respect to a second company for which the first user works but the same biometric identification information is used by the biometric server to identify the employee regardless of whether the first or second company submits an identification query.

System Embodiment 2H. The system (100) of System Embodiment 1, wherein the first individual user identifier is the actual name of the identified individual.

System Embodiment 3. The system (100) of System Embodiment 1, wherein said first processor (308) is further configured to: operate the biometric server to receive (1376), (via the first receiver (342)) a delete biometric information request from the first individual user; and automatically delete (1378), at the biometric server, the first biometric information in response to the biometric information request.

System Embodiment 4. The system (100) of System Embodiment 3, wherein said first processor (308) is further configured to: detect (1364) (e.g., automatically) a security breach at the biometric server; and operate the biometric server to inform (1366) (e.g., automatically) (via the first transmitter (340)) the first user of the detected security breach.

System Embodiment 5. The system (100) of System Embodiment 1, wherein said system (100) includes said first remote system (140); wherein the first remote system (140) includes: a first sensor (1204) (e.g., camera, eye imager, hand scanner, mic for capturing a voice sample, and/or handwriting capture device) for capturing said first captured biometric information; a second transmitter (1214); and a second processor (1202) configured to operate (1346) the first sensor (1204) to capture biometric information (e.g., image, voice and/or handwriting sample) corresponding an individual seeking entry to an area or seeking obtain a service and operate the first remote system (140) to communicate (1348) (via the second transmitter 1214)(e.g., via a network connection) the captured biometric information to the biometric server as part of the first query.

System Embodiment 6. The system (100) of System Embodiment 5, wherein the first query includes information identifying the first remote system (140) (and thus the business corresponding to the system) from which the query is sent.

System Embodiment 7. The system (100) of System Embodiment 6, wherein the first remote system (140) is one of a plurality of amusement park systems (138, 140) to which the biometric server provides identification services.

System Embodiment 8. The system (100) of System Embodiment 6, wherein the first remote system is a home security alarm system located in a home (134) of the first individual user.

System Embodiment 9. The system of System Embodiment 6, wherein the first remote system is an employer business system (104, 106, 108, 136, 138, 140) used by an employer of the first individual user to control access to a business site.

System Embodiment 10. The system of System Embodiment 9, wherein a record stored in the biometric server indicates that the first individual user has authorized the use of the first biometric information to be used for identification services provided for the first individual user's home security system, a first employer system of a first employer who employs the first individual user and at least one amusement park system.

System Embodiment 11. The system of System Embodiment 10, wherein the biometric server stores multiple different types of biometric information corresponding to the first user including a voice sample, a handwriting sample, a face image, and/or hand shape information and/or feature information generated from the stored biometric sample information corresponding to the first user.

Numbered List of Exemplary Apparatus Embodiments

Apparatus Embodiment 1. A server having access to stored biometric information, the server, comprising: a communications interface including a transmitter and receiver, said receiver being configured to receive a query including captured biometric information corresponding to an individual seeking access to a location or seeking a service and indicator of the location to which access is sought or the service to which access is sought; a processor configured to: determine (e.g., by comparing the received biometric information to stored biometric information associated with an individual and corresponding access/service authorization information) if the captured biometric information matches stored biometric information corresponding to an individual authorized to receive access to the location or access to the service indicated in the received query; and control the transmitter to send a response to said query, said response indicating whether the requested access or service should be granted or denied.

Apparatus Embodiment 2. The server of Apparatus Embodiment 1, wherein the response to said query indicates that the requested access or service should be granted when the biometric information received in the query matches stored biometric information corresponding to an individual authorized to access said location or receive said service; and wherein the response to said query indicates that the requested access or service should be denied when the biometric information received in the query is determined not to match (e.g.., does not match) stored biometric information corresponding to an individual authorized to access said location or receive said service.

Apparatus Embodiment 3. The server of Apparatus Embodiment 2, wherein the server further includes or has access to said database storing said biometric information and corresponding access and/or service authorization information.

Numbered List of Exemplary Non-Transitory Computer Readable Medium Embodiments

Non-Transitory Computer Readable Medium Embodiment 1. A non-transitory computer readable medium (312) including machine executable instructions, which when executed by a processor (308) of a biometric server (102 or 300), control the biometric server (102 or 300) to perform the steps of: receiving (1306) at a biometric server first user registration information including first biometric information corresponding to a first individual user; storing (1308) the first biometric information in memory; receiving (1350) a first query including first captured biometric information (e.g., an image or biometric measurement) from a first remote system (e.g., first park server or computer system where images are captured and forwarded as part of a query to the biometric server); performing (1352) at the biometric server a first identification operation on the first captured biometric information, said identification operation being based on at least the first biometric information or features extracted from the first biometric information; and returning (1358) to the first remote system a first query response.

Non-Transitory Computer Readable Medium Embodiment 2. A non-transitory computer readable medium (312) including machine executable instructions, which when executed by a processor (308) of a server (102 or 300) having access to stored biometric information, control the server (102 or 300) to perform the steps of: receiving a query including captured biometric information corresponding to an individual seeking access to a location or seeking a service and indicator of the location to which access is sought or the service to which access is sought; determining if the captured biometric information matches stored biometric information corresponding to an individual authorized to receive access to the location or access to the service indicated in the received query; and sending a response to said query, said response indicating whether the requested access or service should be granted or denied.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

Various embodiments are possible beyond those which have already been described and the invention is not limited to the particular examples which have been discussed above.

The techniques of various embodiments may be implemented using software, hardware and/or a combination of software and hardware. Various embodiments are directed to apparatus, e.g., control nodes/security servers. Various embodiments are also directed to methods, e.g., method of controlling and/or operating a communications device, e.g., a privacy control node and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

In the above described methods, in some embodiments, each step may be performed by one or more different software instructions executed by a computer processor, e.g., a central processing unit (CPU). Various apparatus and/or systems implemented in accordance with the present invention include means for implementing each of the various steps which are part of the methods of the present invention. Each means may be, e.g., an instruction, processor, hardware circuit and/or combination of elements used to implement a described step.

In various embodiments, nodes described herein are implemented using one or more modules to perform the steps corresponding to one or more methods, for example, query processing, receiving and/or transmitting steps. Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., devices such as user equipment device (UEs), and/or control nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., privacy control node and/or a user device, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Numerous additional embodiments, within the scope of the present invention, will be apparent to those of ordinary skill in the art in view of the above description and the claims which follow. Such variations are to be considered within the scope. In various embodiments the user device are mobile nodes which are implemented as notebook computers, personal data assistants (PDAs), or other portable devices including receiver/transmitter circuits and logic and/or routines, for implementing the methods.

What is claimed:

1. A method of providing a biometric service, the method comprising:
receiving, at a service provider system, a purchase order, said purchase order being for an individual to whom a purchased service is to be provided, but whose identity is unknown to the service provider system at the time of the purchase order;
sending, from the service provider system, a provisioning message to a biometric server, said provisioning message including an identifier which can be used to associate, at a later time, biometric information with the purchased service to be provided;
receiving, at the biometric server, said provisioning message including said identifier;
providing the individual, to whom the purchased service is to be provided, said identifier;

receiving at the biometric server, from a user device, subsequent to receiving said provisioning message and subsequent to the individual, to whom the purchased service is to be provided, being provided with said identifier, first user registration information including said identifier and first user provided biometric information corresponding to a first individual user, said first individual user being the individual to whom the purchased service is to be provided, said first individual user registering with said biometric server without disclosure of a real name of the first individual user who will be using the purchased service;

storing the first user provided biometric information in a storage device;

receiving a first query including first captured biometric information from a first remote system, said first remote system being one of a plurality of systems to which the biometric server provides identification services;

performing, at the biometric server, a first identification operation on the first captured biometric information, said first identification operation being based on at least the first captured biometric information or features extracted from the first captured biometric information and the first user provided biometric information included in said received first user registration information with said identifier; and returning to the first remote system a first query response, said first query response being a function of whether the first identification operation indicates a match between the first user provided biometric information included in said received first user registration information with said identifier and the first captured biometric information, said first query response indicating that access to the purchased service should be granted when the first identification operation indicates that there is a match between the first user provided biometric information included in the received first user registration information with said identifier and the first captured biometric information.

2. The method of claim 1,
wherein said identifier is a ticket number; and
wherein the method further comprises:
storing, in said biometric server, first biometric information use authorization information provided by the first individual user, said first biometric information use authorization information indicating businesses for which the first user provided biometric information can be used.

3. The method of claim 1, further comprising:
receiving, at the biometric server, a delete biometric information request from the first individual user; and
automatically deleting, at the biometric server, the first user provided biometric information in response to the received delete biometric information request.

4. The method of claim 3, further comprising:
detecting a security breach at the biometric server; and
informing the first individual user of the detected security breach.

5. The method of claim 1,
wherein said identifier is a ticket number;
wherein the first remote system includes a first sensor for capturing said first captured biometric information, the method further comprising:
operating the first sensor to capture biometric information corresponding an individual seeking entry to an area or seeking to obtain a service; and communicating the captured biometric information to the biometric server as part of the first query.

6. The method of claim 5,
wherein said first service is a park service; and
wherein the first query includes information identifying the first remote system from which the first query is sent.

7. The method of claim 6, wherein the first remote system is an amusement park system used to control access to an amusement park service.

8. The method of claim 6, wherein the first remote system is a home security alarm system located in a home of the first individual user.

9. The method of claim 6, wherein the first remote system is an employer business system used by an employer of the first individual user to control access to a business site.

10. The method of claim 9, wherein a record stored in the biometric server indicates that the first individual user has authorized the use of the first user provided biometric information to be used for identification services provided for the first individual user's home security system, a first employer system of a first employer who employs the first individual user and at least one amusement park system.

11. The method of claim 10, wherein the biometric server stores multiple different types of biometric information corresponding to the first individual user, said different types of biometric information including: a voice sample, a handwriting sample, a face image, hand shape information or feature information.

12. The method of claim 1, wherein the user device is a smartphone or tablet device.

13. The method of claim 1, wherein the user device is a laptop or another communications device via which a user can communicate information with other devices.

14. A system comprising:
a service provider system configured to:
receive a purchase order, said purchase order being for an individual to whom a purchased service is to be provided, but whose identity is unknown to the service provider system at the time of the purchase order;
send a provisioning message to a biometric server, said provisioning message including an identifier which can be used to associate, at a later time, biometric information with the purchased service to be provided;
provide the individual, to whom the purchased service is to be provided, said identifier; and
said biometric server including:
a first receiver;
a first transmitter;
a storage device; and
a first processor configured to:
operate the biometric server to receive said provisioning message including said identifier from the service provider system;
operate the biometric server to receive, from a user device, subsequent to receiving said provisioning message and subsequent to the individual, to whom the purchased service is to be provided, being provided with said identifier, first user registration information including said identifier and first user provided biometric information corresponding to a first individual user, said first individual user being the individual to whom the purchased service is to be provided, said first individual user registering with said biometric server without disclosure of a real name of the first individual user who will be using the purchased service;

store the first user provided biometric information in said storage device;

operate the biometric server to receive a first query including first captured biometric information from a first remote system, said first remote system being one of a plurality of systems to which the biometric server provides identification services;

perform, at the biometric server, a first identification operation on the first captured biometric information, said first identification operation being based on at least the first captured biometric information or features extracted from the first captured biometric information and the first user provided biometric information included in said received first user registration information with said identifier; and operate the biometric server to return to the first remote system a first query response, said first query response being a function of whether the first identification operation indicates a match between the first user provided biometric information included in said received first user registration information with said identifier and the first captured biometric information, said first query response indicating that access to the purchased service should be granted when the first identification operation indicates that there is a match between the first user provided biometric information included in the received first user registration information with said identifier and the first captured biometric information.

15. The system of claim 14,
wherein said identifier is a ticket number; and
wherein said first processor is further configured to:
store, in said server storage device, first biometric information use authorization information provided by the first individual user, said first biometric information use authorization information indicating businesses for which the first user provided biometric information can be used.

16. The system of claim 14, wherein said first processor is further configured to:
operate the biometric server to receive a delete biometric information request from the first individual user; and
automatically delete, at the biometric server, the first user provided biometric information in response to the received delete biometric information request.

17. The system of claim 16, wherein said first processor is further configured to:
detect a security breach at the biometric server; and
operate the biometric server to inform the first individual user of the detected security breach.

18. The system of claim 14,
wherein said identifier is a ticket number;
wherein said system includes said first remote system; and
wherein the first remote system includes:
a first sensor for capturing said first captured biometric information;
a second transmitter; and
a second processor configured to:
operate the first sensor to capture biometric information corresponding an individual seeking entry to an area or seeking to obtain a service; and
operate the first remote system to communicate the captured biometric information to the biometric server as part of the first query.

19. The system of claim 18,
wherein said first service is a park service; and
wherein the first query includes information identifying the first remote system from which the first query is sent.

20. The system of claim 19,
wherein the first remote system is an amusement park system used to control access to an amusement park service.

* * * * *